United States Patent
Funahashi

[11] Patent Number: 6,115,197
[45] Date of Patent: *Sep. 5, 2000

[54] ZOOM LENS BARREL

[75] Inventor: Akira Funahashi, Sakai, Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/199,806

[22] Filed: Nov. 25, 1998

[30] Foreign Application Priority Data

Nov. 26, 1997 [JP] Japan ................................. 9-324182

[51] Int. Cl.$^7$ ........................................ G02B 7/02
[52] U.S. Cl. .................... 359/826; 359/823; 359/701; 359/704; 396/72; 396/79
[58] Field of Search .................... 359/823, 826, 359/700, 701, 704, 699; 396/72, 79, 85

[56] References Cited

U.S. PATENT DOCUMENTS

| | | | |
|---|---|---|---|
| 4,950,060 | 8/1990 | Nagaska | 359/701 |
| 5,035,493 | 7/1991 | Tanaka | 359/701 |
| 5,037,187 | 8/1991 | Oda et al. | 359/699 |
| 5,589,987 | 12/1996 | Tanaka | 359/701 |
| 5,666,565 | 9/1997 | Wakabayashi et al. | 396/79 |
| 5,721,645 | 2/1998 | Iwasaki et al. | 359/823 |
| 5,765,048 | 6/1998 | Nomura et al. | 396/72 |

*Primary Examiner*—Loha Ben
*Attorney, Agent, or Firm*—Burns, Doane, Swecker & Mathis, LLP

[57] ABSTRACT

A zoom lens barrel has a stationary barrel, a rotatable cam barrel, a straight-movable barrel, a first lens component, and a second lens component. The stationary barrel is fixed to a camera body. The rotatable cam barrel is screw-engaged with the stationary barrel and moves along the optical axis while rotating about the optical axis. The straight-movable barrel is guided straight along the optical axis by the stationary barrel and is fitted to the rotatable cam barrel so as to be movable together therewith along the optical axis and rotatable independently thereof about the optical axis. The first lens component is fixed to the straight-movable barrel. The second lens component is guided straight along the optical axis by the straight-movable barrel and is cam-coupled to the rotatable cam barrel so as to be cam-driven along the optical axis by the rotatable cam barrel.

20 Claims, 29 Drawing Sheets

DATA TO BE WRITTEN TO THE ROM

ZOOM LENS BARREL

This application is based on application No. H09-324182 filed in Japan, the content of which is hereby incorporated by reference.

BACKGROUND OF THE INVENTION

1. Field of the Invention

The present invention relates to a zoom lens barrel having a single movable segment for use in photographic cameras and the like.

2. Description of the Prior Art

Conventionally, a zoom lens barrel having a single movable segment as is typically employed in a lens-shutter camera is generally provided with four barrels. FIG. 33 schematically shows a vertical section of such a conventional zoom lens barrel (the other half, i.e. the part below the optical axis represented by the dash-and-dot line, is omitted). In this figure, reference numeral 51 represents a first optical unit disposed at the front end of the zoom lens barrel, reference numeral 52 represents a second optical unit disposed behind the first optical unit 51, reference numeral 53 represents a stationary barrel fixed on the camera body, reference numeral 54 represents a rotary barrel disposed outside the stationary barrel 53, reference numeral 55 represents a straight-movable barrel that has the first optical unit 51 fixed at its front end so as to be moved together therewith, and reference numeral 56 represents a rotating movable barrel disposed inside and behind the straight-movable barrel 55.

The rotary barrel 54 and the stationary barrel 53 are so coupled together that the two move together along the optical axis and rotate individually about the optical axis. The straight-movable barrel 55 and the rotating movable barrel 56 are coupled together in the same manner. The rectilinear movement of the straight-movable barrel 55 is guided by the stationary barrel 53, and is driven by the rotation of a cam groove (not shown) formed in the rotary barrel 54. Thus, as the straight-movable barrel 55 moves along the optical axis, the rotating movable barrel 56 moves together.

Meanwhile, the rotating movable barrel 56 receives a rotational force from the rotary barrel 54 through clearance slots (not shown) formed in the stationary barrel 53, and thus the rotating movable barrel 56 rotates together with the rotary barrel 54. The rectilinear movement of the second optical unit 52 is guided by the straight-movable barrel 55, and is driven by the rotation of a cam groove (not shown) formed in the rotating movable barrel 56. In this way, this conventional zoom lens barrel of a single-movable-segment type achieves zooming movement.

However, this zoom lens barrel has the following disadvantages. First, as described above, it has as many as four barrels. This unduly increases the number of required components and thus the cost. Second, the stationary barrel 53 needs to have guide slots for rectilinearly guiding the straight-movable barrel 55 as well as clearance slots for transmitting the rotation of the rotary barrel 54 to the rotating movable barrel 56. Since these slots are not permitted to intersect each other, and since as much mechanical strength as possible needs to be secured in each component barrel, it is impossible to secure sufficiently large rotation angles for the rotation of the rotary barrel 54 and the rotating movable barrel 56.

SUMMARY OF THE INVENTION

An object of the present invention is to provide a compact and low-cost zoom lens barrel composed of as few barrels as possible in which a wide zoom range is achieved by the large-angle rotation of relevant components.

To achieve the above object, according to one aspect of the present invention, a zoom lens barrel has a stationary barrel, a rotatable cam barrel, a straight-movable barrel, a first lens component, and a second lens component. The stationary barrel is fixed to a camera body. The rotatable cam barrel is screw-engaged with the stationary barrel and moves along the optical axis while rotating about the optical axis. The straight-movable barrel is guided straight along the optical axis by the stationary barrel and is fitted to the rotatable cam barrel so as to be movable together therewith along the optical axis and rotatable independently thereof about the optical axis. The first lens component is fixed to the straight-movable barrel. The second lens component is guided straight along the optical axis by the straight-movable barrel and is cam-coupled to the rotatable cam barrel so as to be cam-driven along the optical axis by the rotatable cam barrel.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
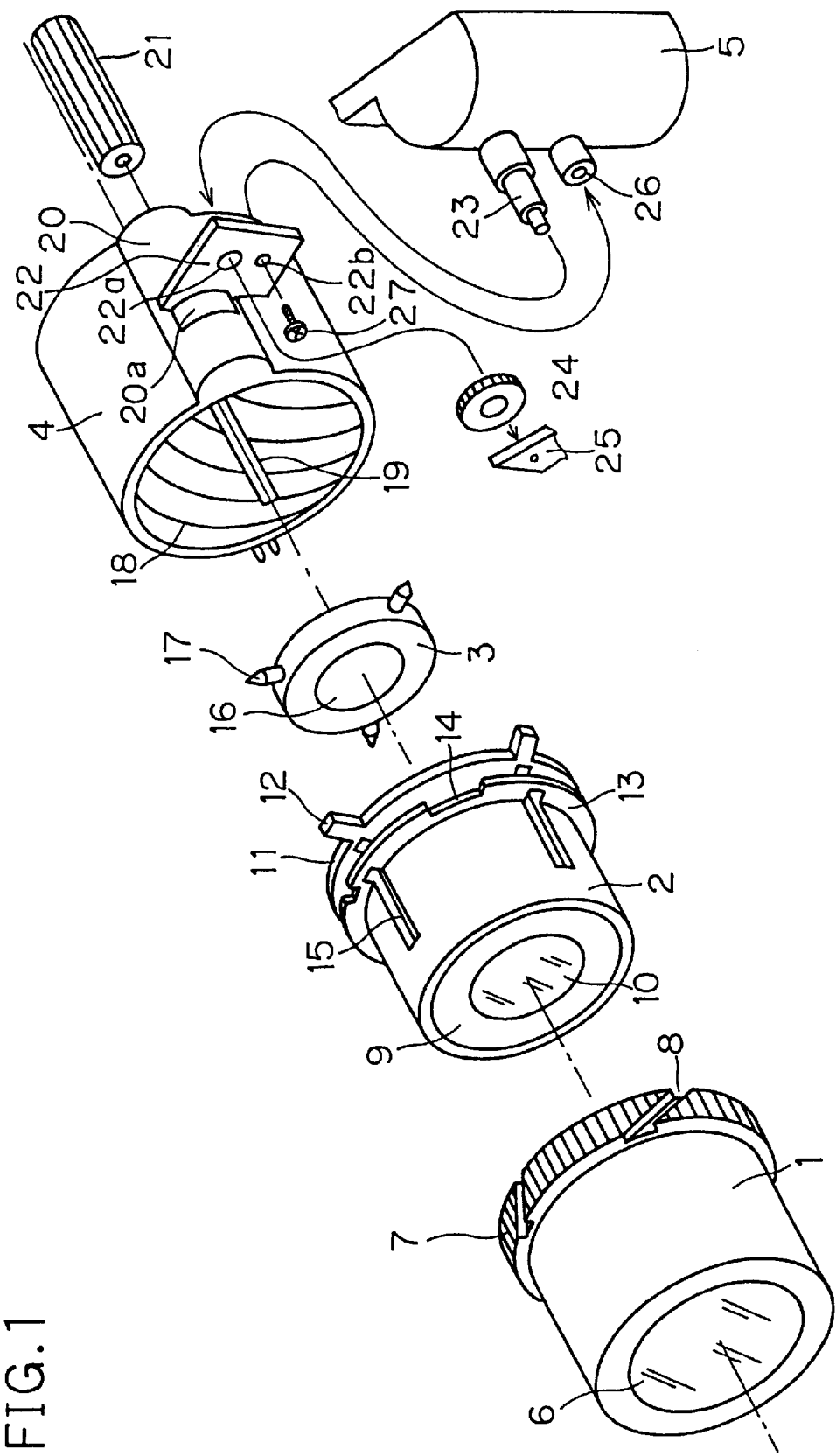
FIG. 1 is an exploded perspective view schematically showing the basic structure of a zoom lens barrel embodying the invention.

Hereinafter, embodiments of the present invention will be described with reference to the drawings. FIG. 1 is an exploded perspective view schematically showing the basic arrangement of a zoom lens barrel embodying the present invention. In FIG. 1, reference numeral 1 represents a rotatable cam barrel, reference numeral 2 represents a straight-movable barrel, reference numeral 3 represents a second lens frame, reference numeral 4 represents a stationary barrel, and reference numeral 5 represents a camera body. The straight-movable barrel 2 is fitted into the rotatable cam barrel 1 and is coupled thereto by a bayonet coupling. The second lens frame 3 is fitted inside the straight-movable barrel 2 and is coupled therethrough to the rotatable cam barrel 1 by a cam coupling. The rotatable cam barrel 1 is fitted into the stationary barrel 4 and is coupled thereto by a helicoid coupling. The stationary barrel 4 is fixed to the camera body 5 with a screw. As compared with conventional zoom lens barrels, which have four barrels, the zoom lens barrel of this embodiment has only three barrels. As will be described in detail later, these three barrels, and also the second lens frame 3 included therein, are all coaxial with the optical axis, which is indicated by the dash-and-dot line in the figure.

The rotatable cam barrel 1 has a transparent lens barrier 6 fitted at its front end. The transparent lens barrier 6 serves to protect the lens elements housed inside. Moreover, the rotatable cam barrel 1 has a circumferential gear 7 formed around the outer surface of its rear-end portion. The circumferential gear 7 has, in several positions around its outer surface, outer helicoids 8 carved so as to be deeper than the base line of the gear teeth. As will be described later, this circumferential gear 7 receives a driving force, and, by this driving force, the rotatable cam barrel 1 is driven to rotate and simultaneously, by the action of the outer helicoids 8, move along the optical axis.

The straight-movable barrel 2 has a first lens frame 9 fitted at its front end. The first lens frame 9 has a first lens element 10 fitted therein. Moreover, the straight-movable barrel 2 has an end flange 11 formed around the outer surface of its rear-end portion. The end flange 11 has, in several positions (e.g. in three positions in this embodiment) around its outer edge, straight guide projections 12 formed so as to protrude radially outward. Furthermore, the straight-movable barrel 2 has a bayonet flange 13 formed around the outer surface of its portion a predetermined distance in front of the end flange 11. The bayonet flange 13 has, in several positions (e.g. in three positions in this embodiment) around its outer edge, clearances 14 formed so as to allow the straight-movable barrel 2 to be fitted into the rotatable cam barrel 1. In addition, the straight-movable barrel 2 has, in several positions (e.g. in three positions in this embodiment) around its outer surface, straight guide grooves 15 formed so as to extend parallel to the optical axis, with clearances formed at the base of the end flange 11 and of the bayonet flange 13.

The second lens frame 3 has a second lens element 16 fitted therein. Moreover, the second lens frame 3 has, in several positions (e.g. in three positions in this embodiment) around its outer surface, cam pins 17 formed so as to protrude radially outward. The stationary barrel 4 has, around its inner surface, inner helicoids 18 formed so as to protrude inward. Moreover, the stationary barrel 4 has, in several positions (e.g. in three positions in this embodiment) around its inner surface, straight guide grooves 19 formed so as to extend parallel to the optical axis.

Furthermore, the stationary barrel 4 has, in one position around its outer surface, a pocket 20 formed so as to extend parallel to the optical axis. This pocket 20 is for housing a long driving gear 21. In addition, a flange 22 is formed so as to span the pocket 20 and a part of the outer surface of the stationary barrel 4. This flange 22 has a shaft hole 22a formed therein. Through this shaft hole 22a, a shaft 23 provided in the camera body 5 is fitted, and thereby the stationary barrel 4 is positioned appropriately relative to the camera body 5. The shaft 23 is then fitted with a driving gear 24 and a gear stopper 25 at its front end.

Through a window 20a formed in the wall of the pocket 20, the driving gear 24 meshes with the long driving gear 21. On the other hand, the flange 22 also has a screw hole 22b formed therein. Through this screw hole 22b, a screw 27 is screwed into a boss 26 formed on the camera body 5, and thereby the stationary barrel 4 is fixed to the camera body 5.

Figure 2:
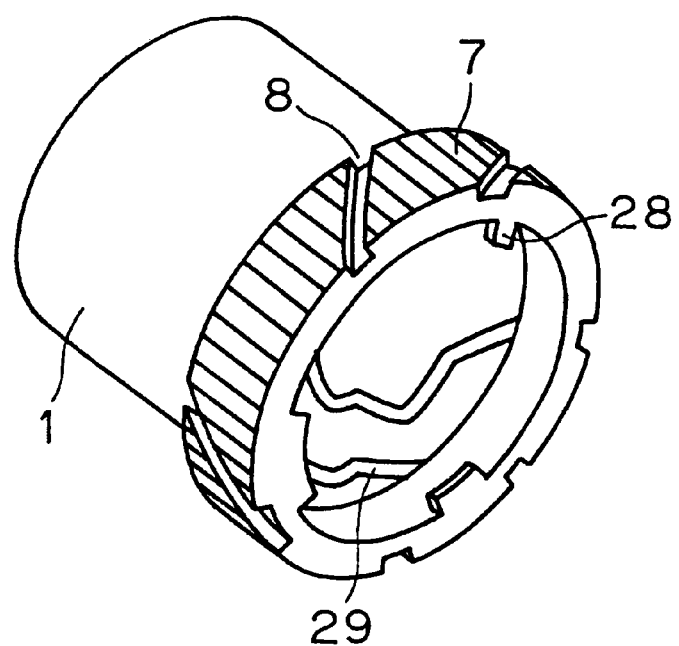
FIG. 2 is a perspective view of the rotatable cam barrel as seen from behind.

FIG. 2 is a perspective view of the rotatable cam barrel 1 as seen from behind. As shown in FIG. 2, the rotatable cam barrel 1 has, in several positions (e.g. in three positions in this embodiment) around the inner surface of its rear-end portion, bayonet hooks 28 formed so as to protrude radially inward. The rotatable cam barrel 1 also has, in the inner surface of its portion in front of those bayonet hooks 28, cam grooves 29 carved so as not to penetrate through. In assembly, when the straight-movable barrel 2 (FIG. 1) is fitted into the rotatable cam barrel 1, the bayonet hooks 28 are introduced, through the clearances 14 formed in the bayonet flange 13, into the gap between the end flange 11 and the bayonet flange 13, thus achieving a bayonet coupling. In this way, the rotatable cam barrel 1 and the straight-movable barrel 2 are coupled together in such a way that the two move together along the optical axis and rotate individually about the optical axis. Since the cam grooves 29 of the rotatable cam barrel 1 are so formed as not to penetrate through, sufficient mechanical strength can be secured as will not be attained if a cam is formed in the straightmovable barrel 2.

On the other hand, when the second lens frame 3 (FIG. 1) is fitted into the straight-movable barrel 2, the cam pins 17 of the second lens frame 3 engage, through the straight guide grooves 15 of the straight-movable barrel 2, with the above-mentioned cam grooves 29, thus achieving a cam coupling. As a result, as the rotatable cam barrel 1 rotates, the second lens frame 3 is driven, by this cam coupling, along the optical axis. The unit obtained through the assembly steps described thus far is then fitted into the stationary barrel 4. At this time, the outer helicoids 8 of the rotatable cam barrel 1 screw-engage with the inner helicoids 18 of the stationary barrel 4, thus achieving a helicoid coupling, and the straight guide projections 12 of the straight-movable barrel 2 engage with the straight guide grooves 19 of the stationary barrel 4. At this time, the circumferential gear 7 of the rotatable cam barrel 1 meshes with the long driving gear 21 housed in the pocket 20 of the stationary barrel 4.

Figure 5:
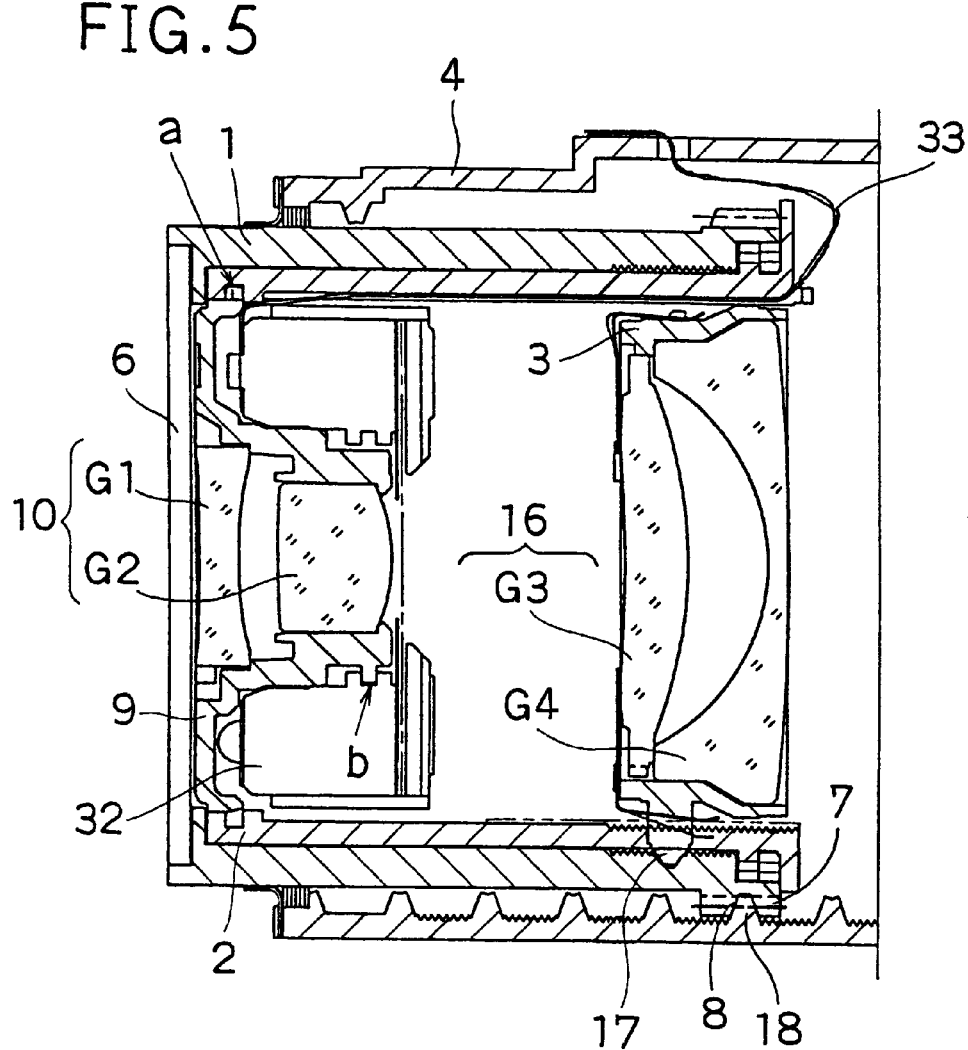
FIG. 5 is a vertical sectional view of the zoom lens barrel of the embodiment as seen from the side.

Note that, as shown in FIG. 5, the straight-movable barrel 2 has a bayonet groove formed in the inner surface of its front-end portion. This bayonet groove engages with a bayonet flange formed on the outer surface of the front-end portion of the first lens frame 9, and thereby the first lens frame 9 is coupled to, and thereby fixed to, the straight-movable barrel 2, thus achieving a bayonet coupling. The first lens frame 9 also has another bayonet flange formed on the outer surface of its rear-end portion. This bayonet flange is coupled to, by a similar bayonet coupling, to a shutter unit, which will be described later, and thereby the shutter unit is held in position. Details will be given later.

Figure 3:
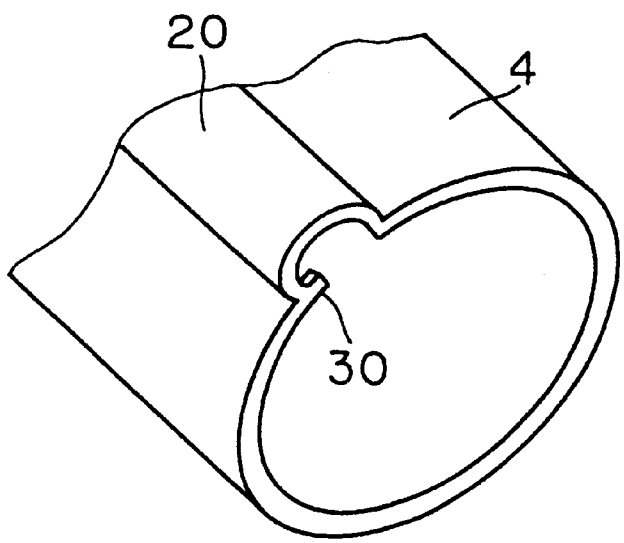
FIG. 3 is a perspective view of the stationary barrel as seen from behind.
Figure 6:
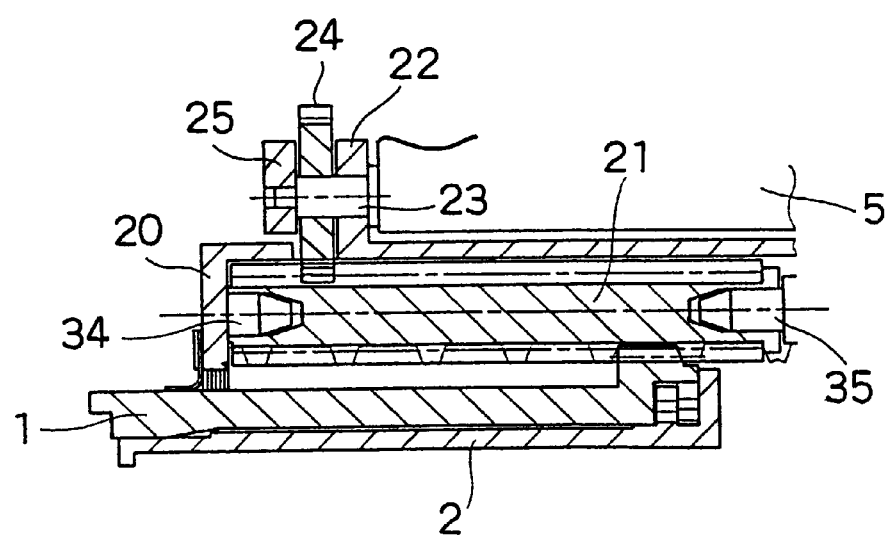
FIG. 6 is a vertical sectional view of the portion around the long driving gear.

As shown in FIG. 6, the long driving gear 21 is rotatably supported, at its front and rear ends, on pivots, of which one is formed on the stationary barrel 4 and the other is formed on the camera body 5. As the long driving gear 21 rotates, it drives the circumferential gear 7 of the rotatable cam barrel 1. Here, note that, in the lens barrel unit in its unmounted state, i.e. in its state just assembled through the assembly steps described thus far and ready for mounting on the camera body 5, the long driving gear 21 is supported only at its front end by the pivot formed inside the frontend portion of the pocket 20 of the stationary barrel 4, and is left unsupported at its rear end. For this reason, as shown in FIG. 3, which is a perspective view of the stationary barrel 4 as seen from behind, a flexible stopper 30 is formed at the rear end of the pocket 20. This flexible stopper 30 helps prevent the long driving gear 21 from coming out, and thereby facilitates assembly and other work. Once the lens barrel unit is mounted on the camera body 5, the stopper 30 is kept away from the long driving gear 21 so as not to function any longer.

After the completion of its assembly as described above, the zoom lens barrel, when driven, operates as follows. A driving force of a motor (not shown) drives the driving gear 24 to rotate. This in turn drives the long driving gear 21 to rotate. This in turn drives the circumferential gear 7 of the rotatable cam barrel 1 to rotate together with the rotatable cam barrel 1 itself. At this time, the helicoid coupling between the outer helicoids 8 of the rotatable cam barrel 1 and the inner helicoids 18 of the stationary barrel 4 causes the rotatable cam barrel 1 to move forward (or backward) while rotating. As a result, the straight-movable barrel 2 moves along the optical axis together with the rotatable cam barrel 1, but meanwhile the straight-movable barrel 2 only moves straight without any rotation, because its straight guide projections 12 are guided along the straight guide grooves 19 of the stationary barrel 4.

As the straight-movable barrel 2 moves, a first optical unit, which includes the first lens frame 9, the first lens element 10, and other components, moves together. On the other hand, a second optical unit, which includes the second lens frame 3, the second lens element 16, and other components, is driven to move along the optical axis by the cam coupling achieved by the cam grooves 29 of the rotatable cam barrel 1 and the straight guide grooves 15 of the straight-movable barrel 2.

Figure 4:
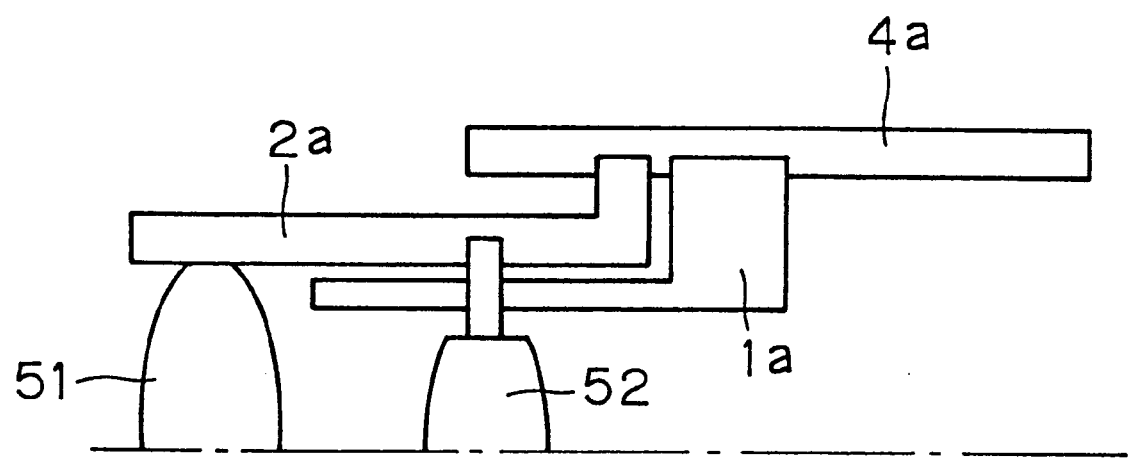
FIG. 4 is a diagram schematically showing a vertical section of an example of the structure of a zoom lens barrel of a different type.

FIG. 4 is a diagram schematically showing a vertical section of an example of the structure of a zoom lens barrel of a different type. Note that, in this figure, the portion below the optical axis, which is indicated by a dash-and-dot line, is omitted. As shown in this figure, in this example, the straight-movable barrel 2a is placed outside the rotatable cam barrel 1a, and the first lens unit 51 and the second lens unit 52 are arranged precisely as in conventional zoom lens barrels. In this structure, when external mechanical force is applied to the straight-movable barrel 2a, it is transmitted first to the rotatable cam barrel 1a, and then, through the helicoid coupling, to the stationary barrel 4a. Thus, such external mechanical force is not borne directly by a fixed member, and therefore it is impossible to secure sufficient mechanical strength.

By contrast, in the embodiment under discussion, the rotatable cam barrel 1 is placed outside. As a result, external mechanical force applied thereto is transmitted, through the helicoid coupling, directly to the stationary barrel 4, and therefore it is possible to secure sufficient mechanical strength.

FIG. 5 is a vertical sectional view of the zoom lens barrel of the embodiment as seen from the side. As described previously in connection with the basic structure, the rotatable cam barrel 1 is fitted with a lens barrier 6 fitted at its front end. The straight-movable barrel 2 is fitted inside the rotatable cam barrel 1 and is coupled thereto by a bayonet coupling at their rear ends. The first lens frame 9 is fitted inside the straight-movable barrel 2 and is fixed thereto by a bayonet coupling at the front end of the latter, i.e. at the portion indicated by arrow a. The shutter unit 32 is fitted outside the first lens frame 9 and is fixed thereto by a bayonet coupling at the read-end portion of the latter, i.e. at the portion indicated by arrow b. The second lens frame 3 is coupled, through the straight-movable barrel 2, to the rotatable cam barrel 1 by a cam coupling achieved by the cam pins 17.

The first lens frame 9 has lens elements G1 and G2 fitted therein as the first lens component 10. The second lens frame 3 has lens elements G3 and G4 fitted therein as the second lens component 16. The rotatable cam barrel 1 is fitted inside the stationary barrel 4 and is coupled thereto by a helicoid coupling that is achieved by the outer helicoids 8 formed around the outer surface of the rear-end portion of the former and the inner helicoids 18 formed around the inner surface of the latter. The shutter unit 32 is electrically connected to the stationary barrel 4 by a flexible circuit board 33.

FIG. 6 is a vertical sectional view of the portion around the long driving gear 21. As shown in this figure, the long driving gear 21, by which the rotatable cam barrel 1 is driven to rotate, is housed inside the pocket 20 formed on the outer surface of the stationary barrel 4 (not shown), and is supported on the pivots 34 and 35 at its front and rear ends. The pivot 34 is formed at the front end of the pocket 20 so as to protrude backward. The pivot 35 is formed on the camera body 5 so as to protrude forward. The long driving gear 21 meshes with the driving gear 24. The driving gear 24 is rotatably fitted around the shaft 23, which is formed on the camera body 5 so as to be fitted through the partial flange 22 formed outside the pocket 20. The driving gear 24 is kept in position by the gear stopper 25, which is fitted at the front end of the shaft 23.

In conventional structures, the force acting between the long driving gear 21 and the driving gear 24 tends to pull these two gears away from each other, causing imperfect gear engagement or insufficient driving force. To prevent these, in some conventional structures, the gears are kept in engagement by the use of extra reinforcement members. By contrast, in the embodiment under discussion, the shaft 23, around which the driving gear 24 is fitted, is securely coupled to the partial flange 22 by being fitted therethrough, and therefore it is not necessary to use extra reinforcement members to keep the gears in engagement. Moreover, by securing another fastening spot nearby, for example as achieved by the use of the screw 27 in FIG. 1, it is possible to obtain even securer coupling.

Figure 7:
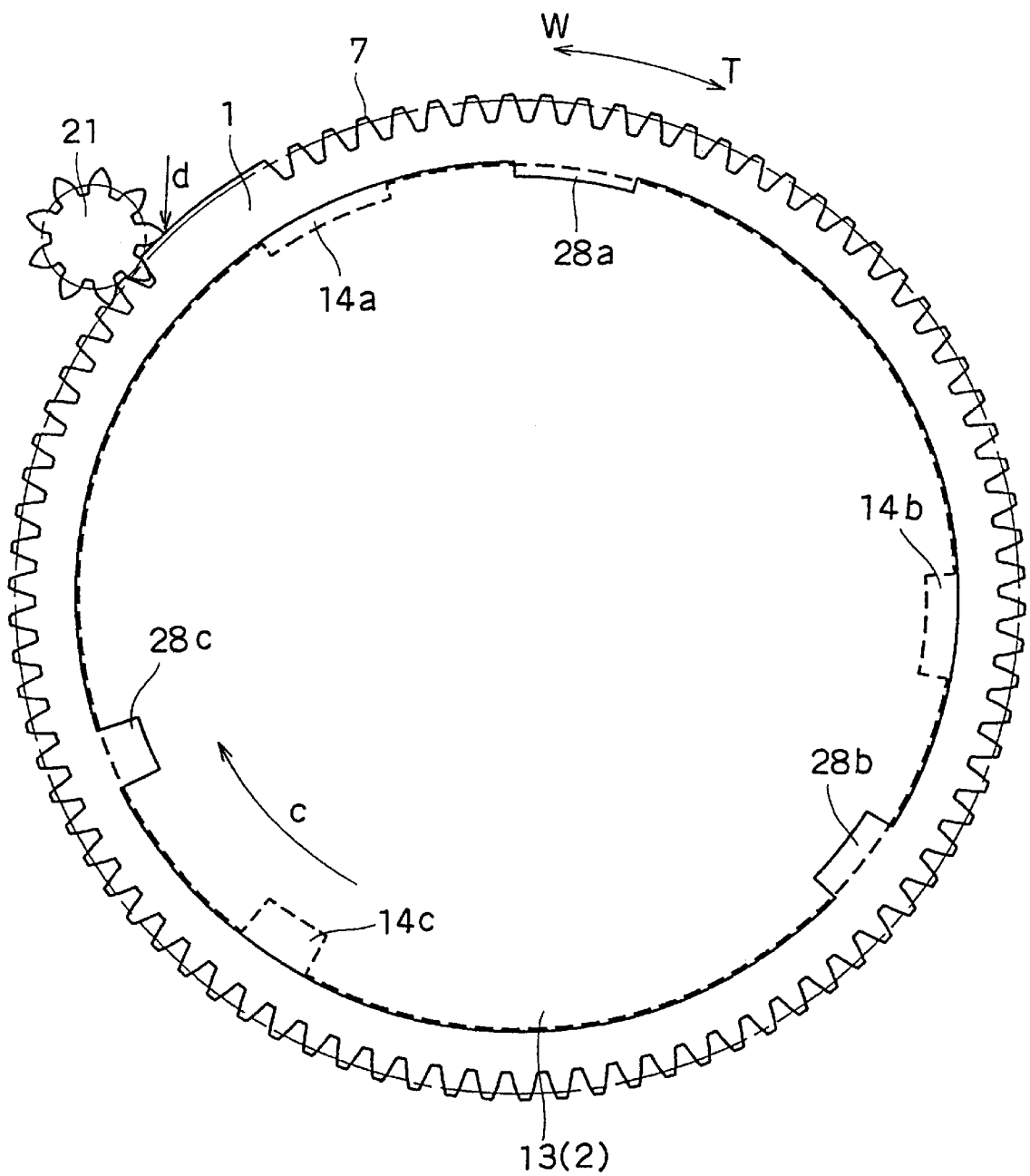
FIG. 7 is a detailed rear view of a part of the zoom lens barrel of the embodiment.

FIG. 7 is a detailed rear view of a part of the zoom lens barrel of the embodiment, as seen when the zoom lens barrel is in its (preliminarily) fully sunk state. As shown in this figure, the bayonet hooks 28a, 28b, and 28c, which are formed in three positions around the inner surface of the rotatable cam barrel 1, are arranged approximately at equal intervals so as to correspond to the clearances 14a, 14b, and 14c formed in three positions around the outer edge of the bayonet flange 13 (illustrated with broken lines) of the straight-movable barrel 2. The circumferential gear 7, which is formed around the outer surface of the rotatable cam barrel 1, meshes with the long driving gear 21, as shown in the upper left-hand corner of the figure.

The bayonet hooks 28a, 28b, and 28c are each differently shaped in their width and height, and so are the clearances 14a, 14b, and 14c. As a result, unless the bayonet hooks are positioned precisely at their corresponding clearances, the bayonet hooks remain engaged with some other part of the bayonet flange than the clearances, and thus none of the bayonet hooks moves outward beyond the bayonet flange. Thus, even if the rotatable cam barrel 1 is designed to be rotatable through almost one complete turn, the component barrels never disengage from each other, or incline with respect to each other.

After the rotatable cam barrel 1, the straight-movable barrel 2, and the stationary barrel 4 (not shown) are assembled together, if the long driving gear 21 is inserted from behind with the rotatable cam barrel 1 rotated through the angle indicated by arrow c, the long driving gear 21 interferes with the untoothed portion (i.e. the portion that is not used when the camera is in use) of the circumferential gear 7 of the rotatable cam barrel 1, and thereby prevents further rotation of the rotatable cam barrel 1 in the direction indicated by arrow W, i.e. in the wide-angle direction. This serves as a preliminary barrel rotation stopper that prevents disengagement of the rotatable cam barrel 1 and the straight-movable barrel 2 from the stationary barrel 4, and thus helps facilitate the mounting on the camera.

When the camera is in use, the zoom lens barrel reaches its fully sunk state when it is rotated further, from the state just described above, in the direction indicated by arrow T, i.e. in the telephoto direction. This fully sunk state is determined by a stopper provided on the camera body 5 (not shown). Note that, although the zoom lens barrel is now still in an unmounted state, as described above, the long driving gear 21 is, though only preliminarily, held in position, and this conveniently prevents the zoom lens barrel from being disassembled inadvertently.

Figure 8:
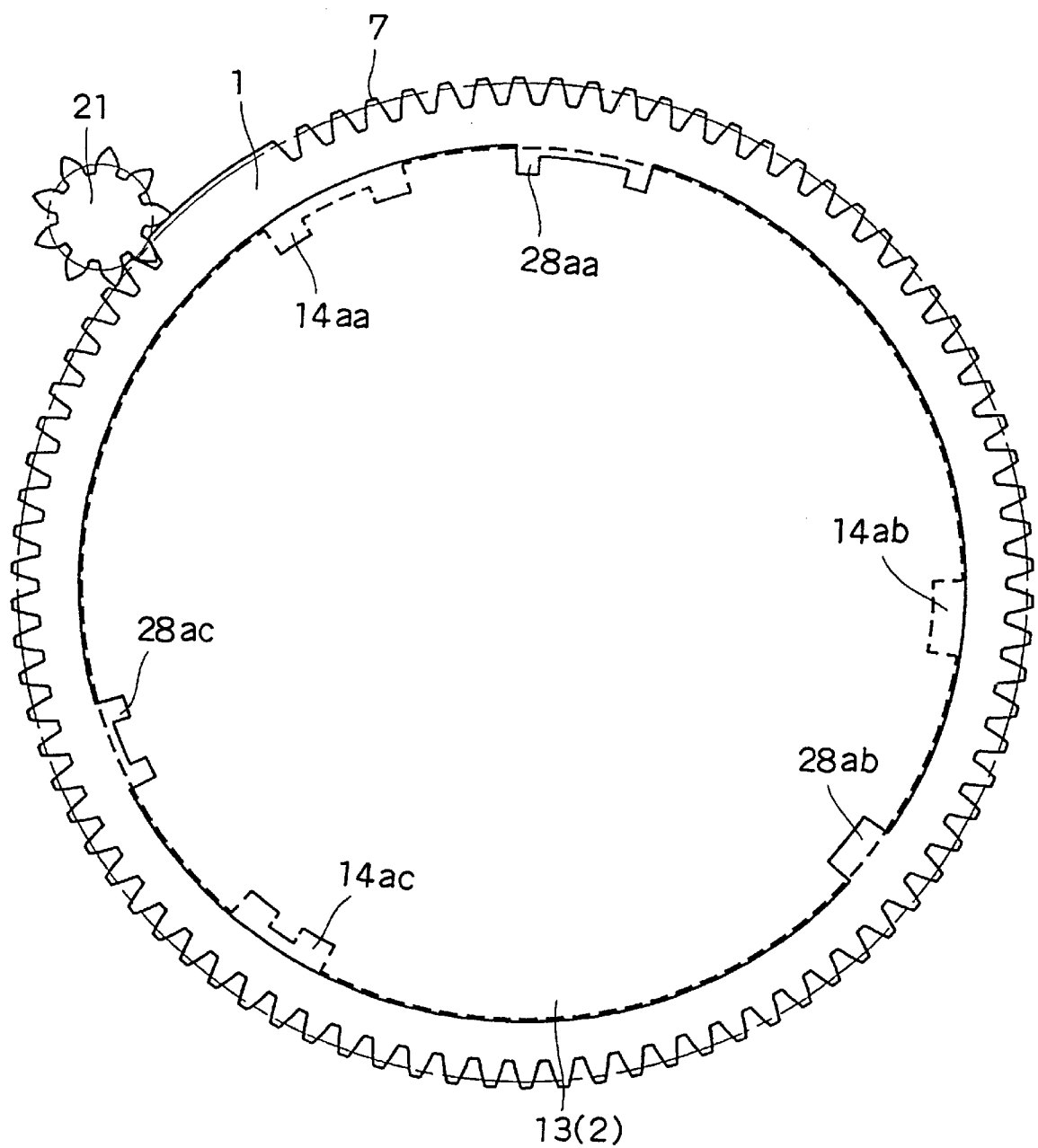
FIG. 8 is a detailed rear view of the same part as shown in FIG. 7, with the bayonet hooks and the clearances for them differently shaped.

FIG. 8 is a detailed rear view of the same part as shown in FIG. 7, with the bayonet hooks and the clearances for them differently shaped. As shown in this figure, here, the bayonet hooks 28aa, 28ab, and 28ac of the rotatable cam barrel 1 and the clearances 14aa, 14ab, and 14ac formed in the bayonet flange 13 of the straightmovable barrel 2 are formed either in the shape of the letter "C" or with a smaller width as compared with those shown in FIG. 7. This helps reduce the heights of these hooks and clearances and thereby save space in radial directions. Even then, the individual hooks and clearances are so formed that, just as in the case shown in FIG. 7, disengagement occurs only when the hooks are positioned precisely at their corresponding clearances, and thus it is possible to achieve the same effect. It is to be understood that the bayonet hooks and their corresponding clearances may be formed in the opposite component barrels to those in which they are formed in the embodiment under discussion.

Figure 9A:
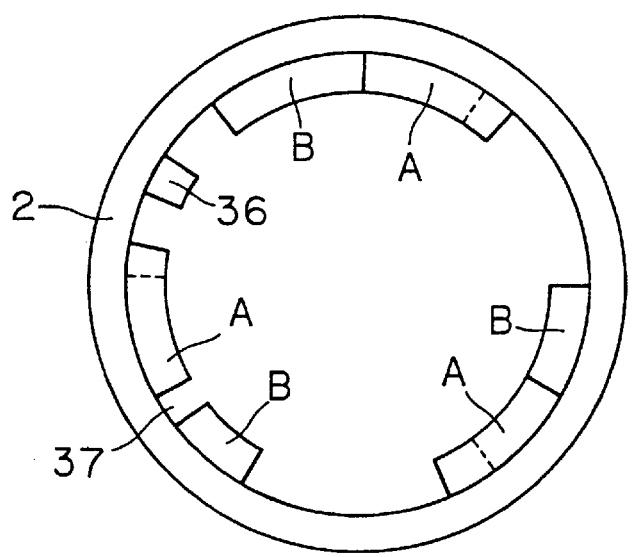
FIGS. 9A and 9B are diagrams schematically illustrating the bayonet-coupling portion at the front end of the straight-movable barrel.
Figure 9B:
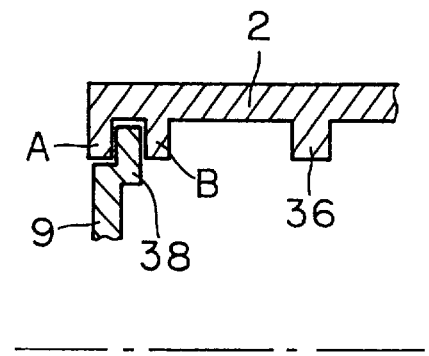
Figure 10A:
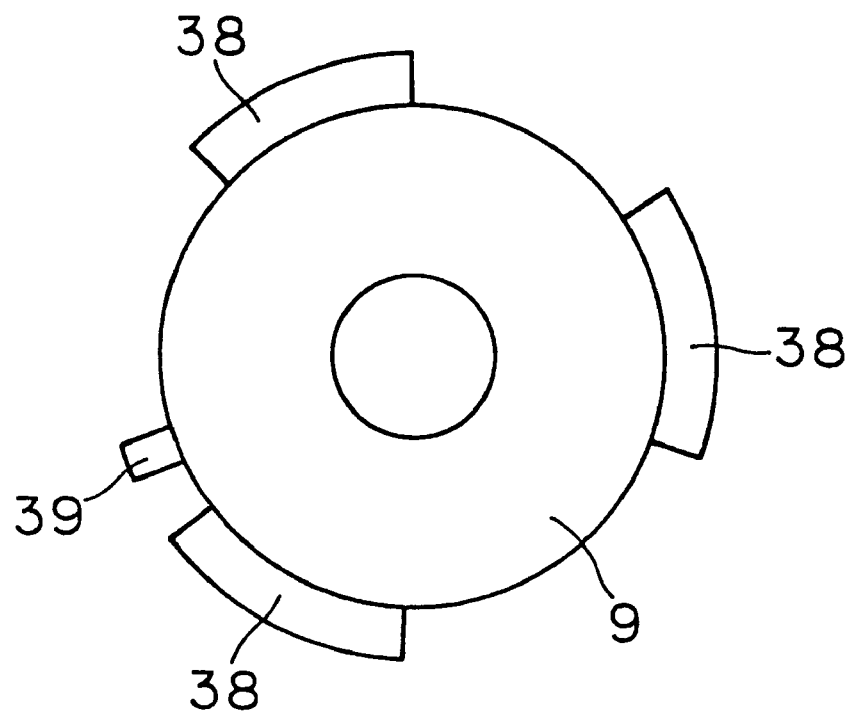
FIGS. 10A and 10B are diagrams schematically illustrating the bayonet-coupling portion at the front end of the first lens frame.
Figure 10B:
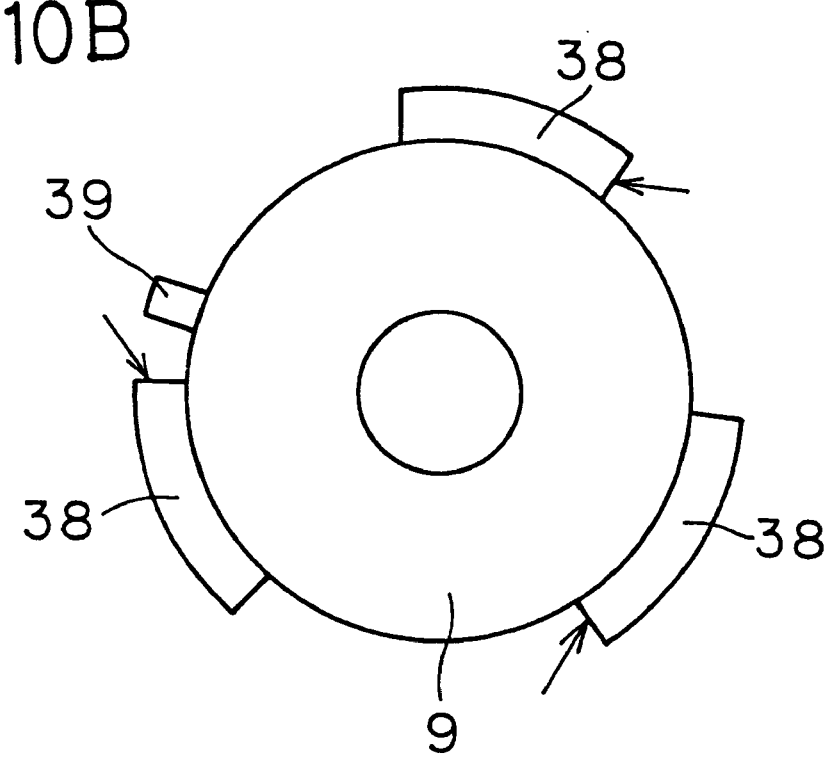

FIGS. 9A and 9B are diagrams schematically illustrating the bayonet-coupling portion at the front end of the straight-movable barrel 2; FIGS. 10A and 10B are diagrams schematically illustrating the bayonet-coupling portion at the front end of the first lens frame 9. As shown in FIG. 9A, which is a front view of the straight-movable barrel 2, the straight-movable barrel 2 has, around its inner surface, three object-side ribs A and, alternately therewith, three film-side ribs B. As shown in FIG. 9B, which is a vertical section, the bayonet flange 38 of the first lens frame 9 is pressed into the gap between the ribs A and B and is thereby fixed in position. Note that, in FIG. 9B, the portion below the optical axis, which is indicated by a dash-and-dot line, is omitted.

The first lens frame 9 is fitted into the straight-movable barrel 2 in the following manner. First, the first lens frame 9, after being rotated to the position as shown in FIG. 10A, is fitted into the straight-movable barrel 2 so that the bayonet flange 38 is placed against the film-side ribs B. At this time, the projection 39 formed on the outer surface of the shutter unit 32 (described later) fitted on the first lens frame 9 is inserted through the clearance 37 of the straight-movable barrel 2. Then, the first lens frame 9 is rotated clockwise to the position as shown in FIG. 10B, that is, until the radial edges (indicated by arrows) of the bayonet flange 38 strike the positioning rims (indicated by broken lines in FIG. 9A) of the object-side ribs A. In this way, the first lens frame 9 is fixed to the straight-movable barrel 2.

At this time, the projection 39 strikes the counter-clockwise-side edge of the rotation stopper 36 formed on the inner surface of the straight-movable barrel 2, and thereby the shutter unit 32 (not shown), now fitted on the first lens frame 9, is prevented from clockwise rotation.

Figure 11A:
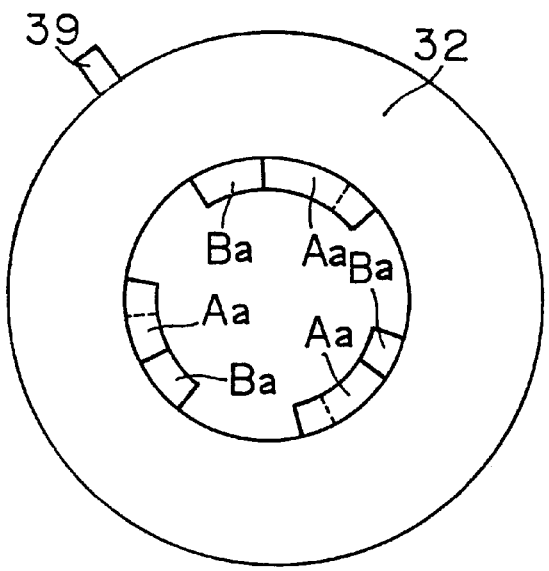
FIGS. 11A and 11B are diagrams schematically illustrating the bayonet-coupling portion at the rear end of the shutter unit.
Figure 11B:
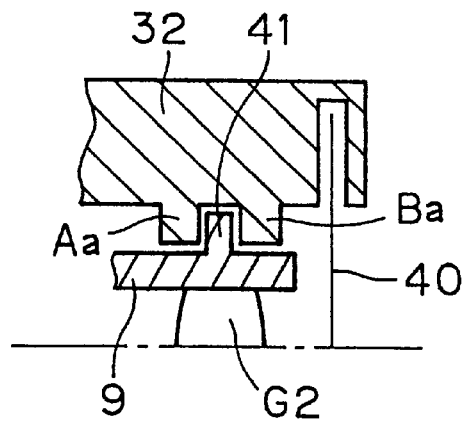
Figure 12A:
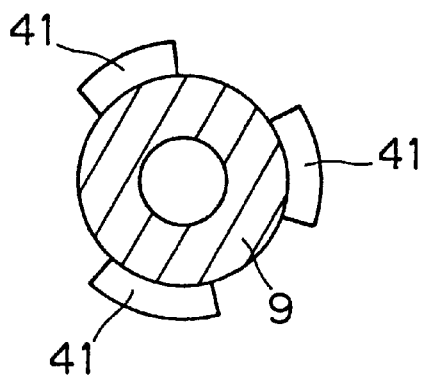
FIGS. 12A and 12B are diagrams schematically illustrating the bayonet-coupling portion at the rear end of the first lens frame.
Figure 12B:
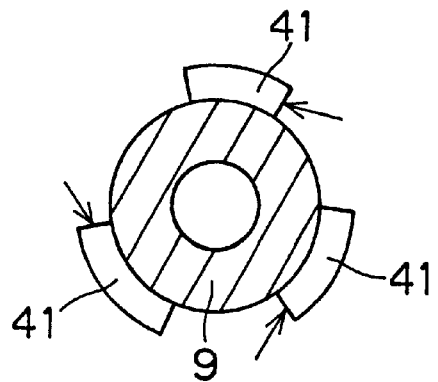

FIGS. 11A and 11B are diagrams schematically illustrating the bayonet-coupling portion at the rear end of the shutter unit 32; FIGS. 12A and 12B are diagrams schematically illustrating the bayonet-coupling portion at the rear end of the first lens frame 9. As shown in FIG. 11A, which is a front view of the shutter unit 32, the shutter unit 32 has, around its inner surface, three object-side ribs Aa and, alternately therewith, three film-side ribs Ba. As shown in FIG. 11B, which is a vertical section, the bayonet flange 41 of the first lens frame 9 is put into the gap between the ribs Aa and Ba. Note that, in FIG. 11B, the portion below the optical axis, which is indicated by a dash-and-dot line, is omitted.

The shutter unit 32 is fitted around the first lens frame 9 in the following manner. First, the first lens unit 9, after being rotated to the position as shown in FIG. 12A, is fitted into the shutter unit 32 so that the bayonet flange 41 is placed against the film-side ribs Ba. Then the first lens frame 9 is rotated clockwise until the radial edges (indicated by arrows) of the bayonet flange 41 strike the positioning rims (indicated by broken lines in FIG. 11A) of the object-side ribs Aa. In this way, the first lens frame 9 is positioned relative to the shutter unit 32. The function of the projection 39 (FIG. 11) formed on the outer surface of the shutter unit 32 is as described previously. Note that, in FIG. 11B, reference numeral 40 represents a shutter blade.

Thereafter, when the first lens frame 9 is pressed into the straight-movable barrel 2 and is thereby fixed thereto as described above in connection with FIGS. 9A, 9B, 10A, and 10B, then the shutter unit 32 is no longer allowed to rotate counter-clockwise. On the other hand, the projection 39 strikes the counter-clockwise-side edge of the rotation stopper 36 of the straight-movable barrel 2, and therefore the shutter unit 32 is not allowed, either, to rotate clockwise beyond the gap left there. In this way, the shutter unit 32 is inhibited from any rotation, and is thereby prevented from moving out of the bayonet coupling and thus out of the first lens frame 9.

It is possible to fix the first lens frame 9 to the shutter unit 32 by pressing the former into the latter. However, a shutter is typically realized by driving a non-rigid shutter blade with weak driving force, and therefore pressing the first lens frame 9 into the shutter unit 32 may cause distortion or deformation of the latter, leading to failure of shuttering. It is also possible to put them together by the use of adhesive. However, a spill of adhesive, if it reaches the shutter blade, may cause failure of shuttering. For these reasons, in the embodiment under discussion, the positioning and fixing of the shutter unit 32 is achieved without applying extra force to the shutter itself as described above.

Figure 13A:
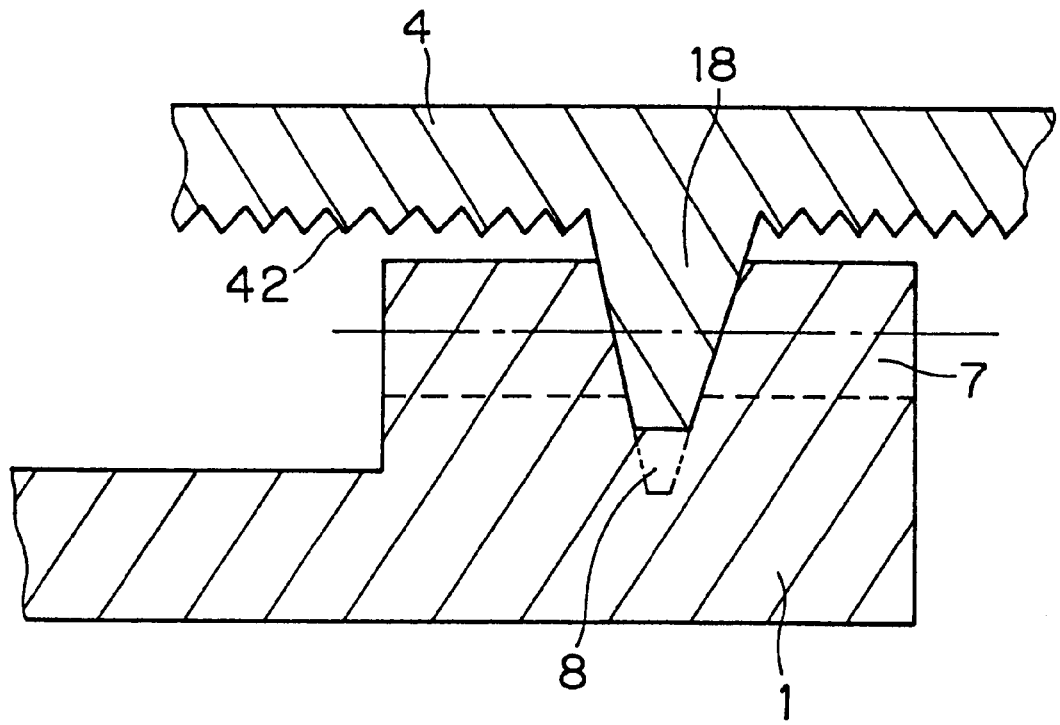
FIGS. 13A and 13B are diagrams schematically illustrating the helicoid coupling.
Figure 13B:
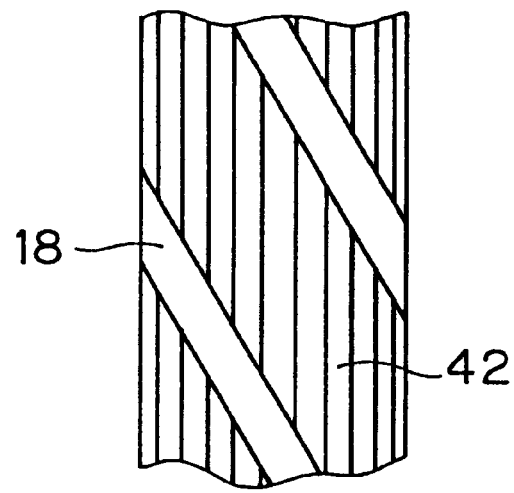

FIGS. 13A and 13B are diagrams schematically illustrating the helicoid coupling, with FIG. 13A showing an enlarged vertical section and FIG. 13B showing an unfolded view of the inner surface of the stationary barrel 4. As shown in FIG. 13A, the inner helicoids 18 formed on the inner surface of the stationary barrel 4 screw-engage, and thus achieve a helicoid coupling, with the outer helicoids 8 carved in several positions around the outer surface of the circumferential gear 7, which is formed on the outer surface of the rear-end portion of the rotatable cam barrel 1. Here, the rotatable cam barrel 1 is typically formed by resin molding. The die for forming it is at first so produced as to form the outer helicoids 8 deeper than is necessary, as indicated by dash-dot-dot lines; later, in accordance with the actually produced inner helicoids 18, which are finished first, the die is so shaved as to make the outer helicoids 8 less deep so that the gap between the ridge of the inner helicoids 18 and the bottom of the outer helicoids 8 is reduced until no backlash remains therebetween. Note that, the pitch diameter of the circumferential gear 7 is indicated by a dash-and-dot line.

If the outer helicoids 8 are shallower than the base line, indicated by a broken line in FIG. 13A, of the gear teeth of the circumferential gear 7, they interfere with the tooth crests of the long driving gear 21, with which the circumferential gear 7 engages. Therefore, the outer helicoids 8 need to be as deep as or deeper than the base line of the gear teeth of the circumferential gear 7. In this case, the bottom of the outer helicoids 8, as determined in accordance with the actually produced inner helicoids 18, substantially coincides with the ridge of the inner helicoids 18, and, since the outer helicoids 8 are produced in accordance with the actually produced inner helicoids 18, the final depth of the former depends on the height of the latter.

Since the stationary barrel 4 and the rotatable cam barrel 1 are separate components, it is difficult to adjust the height of the ridge of the inner helicoids 18, which are formed on the former, to the base line of the gear teeth of the circumferential gear 7, which is formed on the latter. For this reason, it is advisable, on the part of the stationary barrel 4, to make the ridge of the inner helicoids 18 as low (relative to the optical axis) as possible, as long as the bottom of the outer helicoids 8 can be made deeper than the base line of the gear teeth of the circumferential gear 7. This also helps prevent external light from coming in along the troughs of the gear teeth.

Figure 14A:
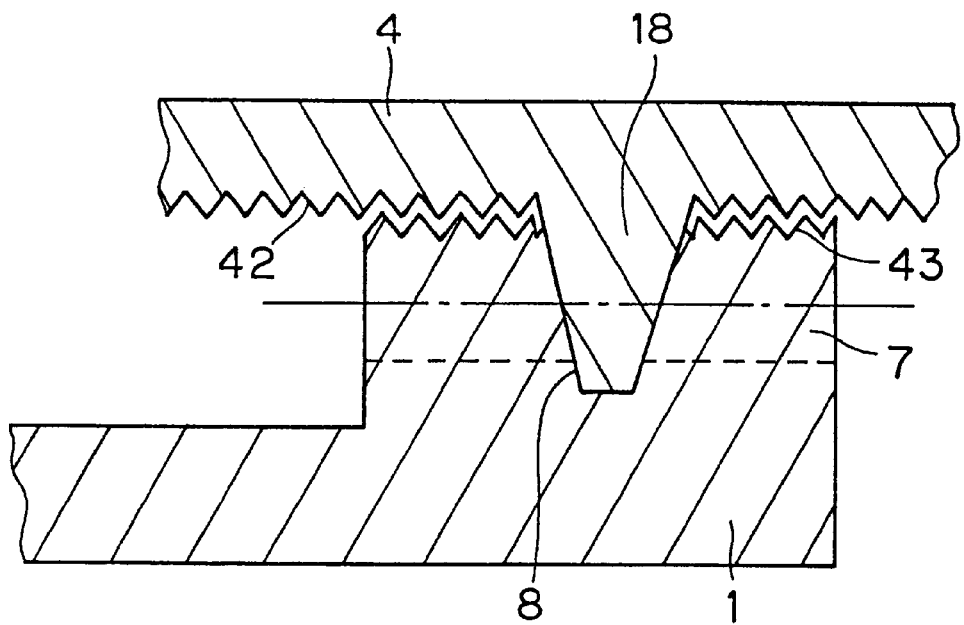
FIGS. 14A, 14B, and 14C are diagrams schematically illustrating the helicoid coupling, with clearance grooves additionally formed therein.
Figure 14B:
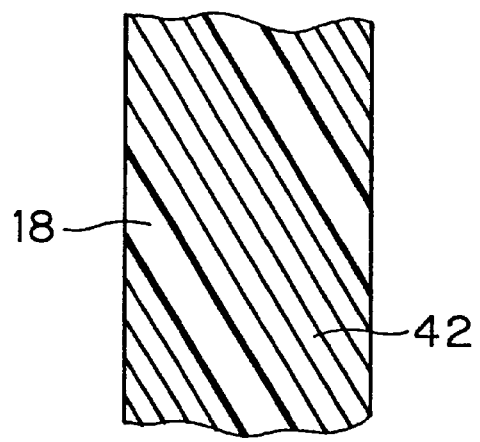
Figure 14C:
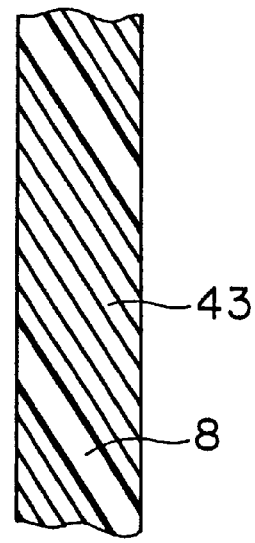

As shown in FIG. 13B, which is an unfolded view of the inner surface of the stationary barrel 4, the stationary barrel 4 has light-shielding grooves 42 formed on its inner surface. These light-shielding grooves 42 are usually so formed as to be perpendicular to the optical axis (indicated by arrows). This makes it necessary to secure a clearance gap between the light-shielding grooves 42 and the tooth crests of the circumferential gear 7. However, by additionally forming clearance grooves 43 in the tooth crests of the circumferential gear 7 as shown in FIG. 14A, with the light-shielding grooves 42 formed not perpendicularly to the optical axis but parallel to the inner helicoids 18, and with the clearance grooves 43 accordingly formed parallel to the outer helicoids 8, as illustrated in unfolded views shown in FIG. 14B and 14C respectively, it is possible to eliminate the need for such a clearance gap, and thereby reduce the diameter of the lens barrel. Note that reducing the width of the gear teeth at their ridges does not seriously affect the mechanical strength of the circumferential gear 7, because the mechanical strength of a gear depends on that of the base portions of its gear teeth.

Figure 15:
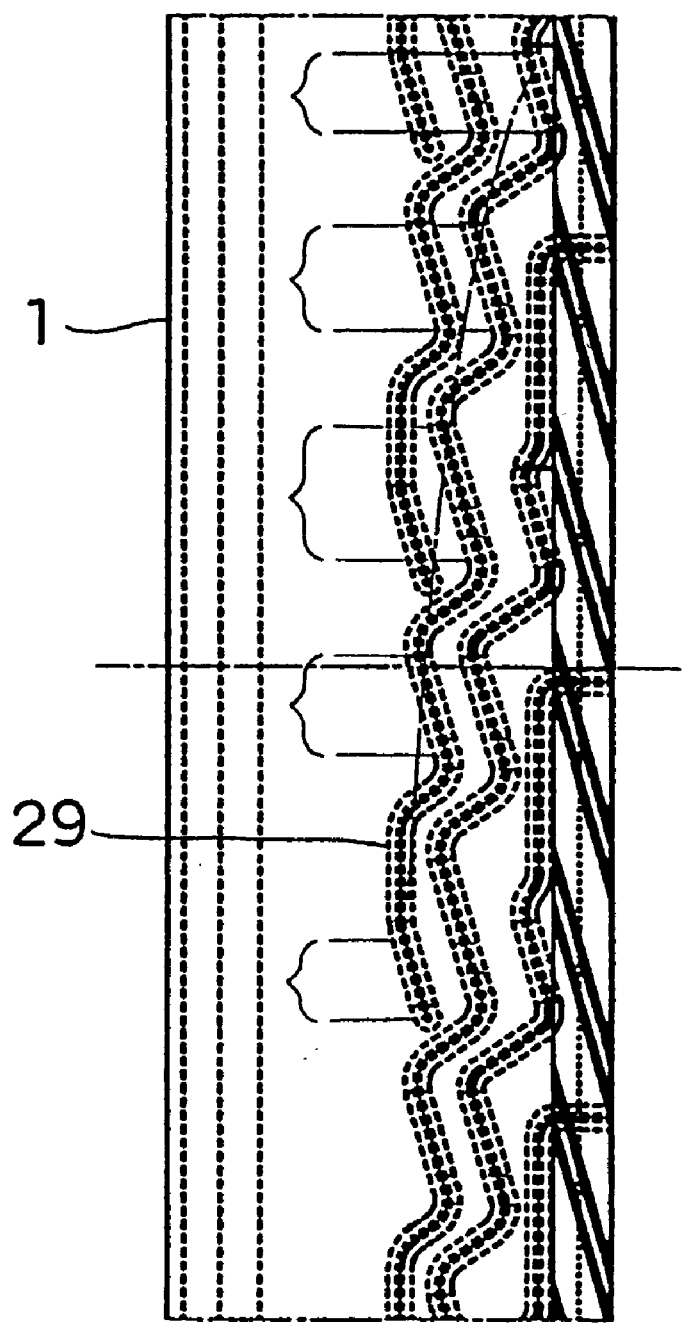
FIG. 15 is an unfolded view of the inner surface of the rotatable cam barrel.

FIG. 15 is an unfolded view of the inner surface of the rotatable cam barrel 1. As shown in this figure, on the inner surface of the rotatable cam barrel 1, the cam grooves 29 are formed, with which, as described previously, the cam pins 17 of the second lens frame 3 engage so as to achieve a cam coupling. As the rotatable cam barrel 1 rotates, this cam coupling causes the second lens frame 3 to move along the optical axis. Of all the cam grooves illustrated in FIG. 15, the braced portions are used for focusing, and the remaining portions are used for zooming. That is, in this cam, the portions used for zooming and those used for focusing are arranged alternately.

The portions used for focusing are so formed as to incline at the same angle as, but in the opposite direction to, the inner helicoids 18 formed on the inner surface of the stationary barrel 4. As a result, as the rotatable cam barrel 1 moves along the optical axis, the second lens frame 3 moves through the same distance as, but in the opposite direction to, the rotatable cam barrel 1; that is, the second lens frame 3 remains stationary relative to the stationary barrel 4. Meanwhile, the first lens frame 9 moves together with the rotatable cam barrel 1, and thereby achieves focusing.

In this type of lens barrel, in which zooming and focusing are achieved integrally by the use of a stepped cam as described above, zooming and focusing are driven by a single mechanism. In this type of lens barrel, the members driven for focusing tend to be larger and thus cause a longer release time lag due to inertia and other factors than in a conventional lens barrel of the type in which the focusing lens is driven by a separate driving-force source dedicated thereto. This inconvenience can be overcome by adopting a driving system that operates sufficiently fast, but this also makes zooming operations so fast that it is difficult to obtain an appropriate angle of view in actual use of the camera.

Figure 16:
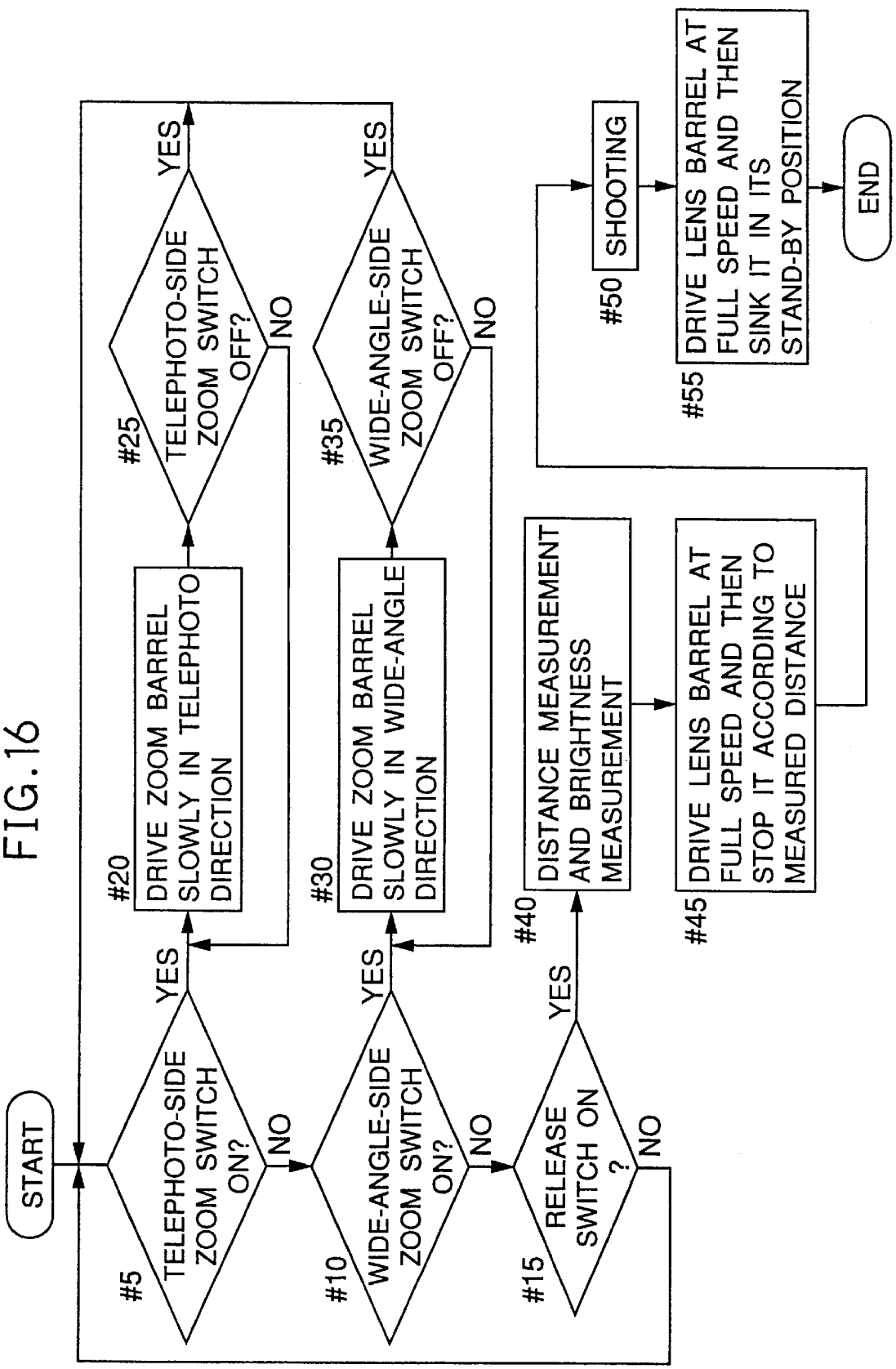
FIG. 16 is a flow chart showing the procedure performed to control zooming and focusing.

For this reason, in the embodiment under discussion, a fast-operating driving system is adopted, and it is controlled according to the flow chart shown in FIG. 16 in such a way that zooming operations are performed more slowly than focusing operations. As shown in this figure, at the start of shooting, first, in step #5, whether the telephoto-side zoom switch is being pressed or not is checked; if not, the procedure proceeds to step #10. Next, in step #10, whether the wide-angle-side zoom switch is being pressed or not is checked; if not, the procedure proceeds to step #15. Then, in step #15, whether the release switch is being pressed or not is checked; if not, the procedure returns to its starting point.

If, in step #5, the telephoto-side zoom switch is found to be pressed, the procedure proceeds to step #20, where the zoom barrel is driven slowly in the telephoto direction. Then, in step #25, whether the telephoto-side zoom switch is released or not is checked; if not, the procedure returns to step #20 to continue driving. If, in step #25, the telephoto-side zoom switch is found to be released, the procedure returns to its starting point.

If, in step #10, the wide-angle-side zoom switch is found to be pressed, the procedure proceeds to step #30, where the zoom barrel is driven slowly in the wideangle direction. Then, in step #35, whether the wide-angle-side zoom switch is released or not is checked; if not, the procedure returns to step #30 to continue driving. If, in step #35, the wide-angle-side zoom switch is found to be released, the procedure returns to its starting point.

If, in step #15, the release switch is found to be pressed, then, in step #40, distance measurement and brightness measurement are performed. Then, in step #45, in accordance with the measured distance, focusing is performed by driving the lens barrel at full speed until it is stopped in the target position. Then, in step #50, shooting is performed, and then, in step #55, the lens barrel is driven at full speed so as to be sunk until it is stopped in its stand-by position. This is the end of the procedure. Here, the driving speed and the stopping of the lens barrel are controlled by PWM control. The zooming speed and the focusing speed are controlled in such a way that, when the power source voltage has lowered, the former remains higher than the latter.

In reality, however, even when one of the above zoom switches is found to be released, the procedure does not immediately return to its starting point, but continues the driving until the lens barrel reaches one of specific positions (hereafter referred to as the zoom positions) provided to achieve step zooming as described later. Therefore, it is to be understood that the flow chart shown in FIG. 16 includes such operations, even through it does not show them specifically.

Figure 17:
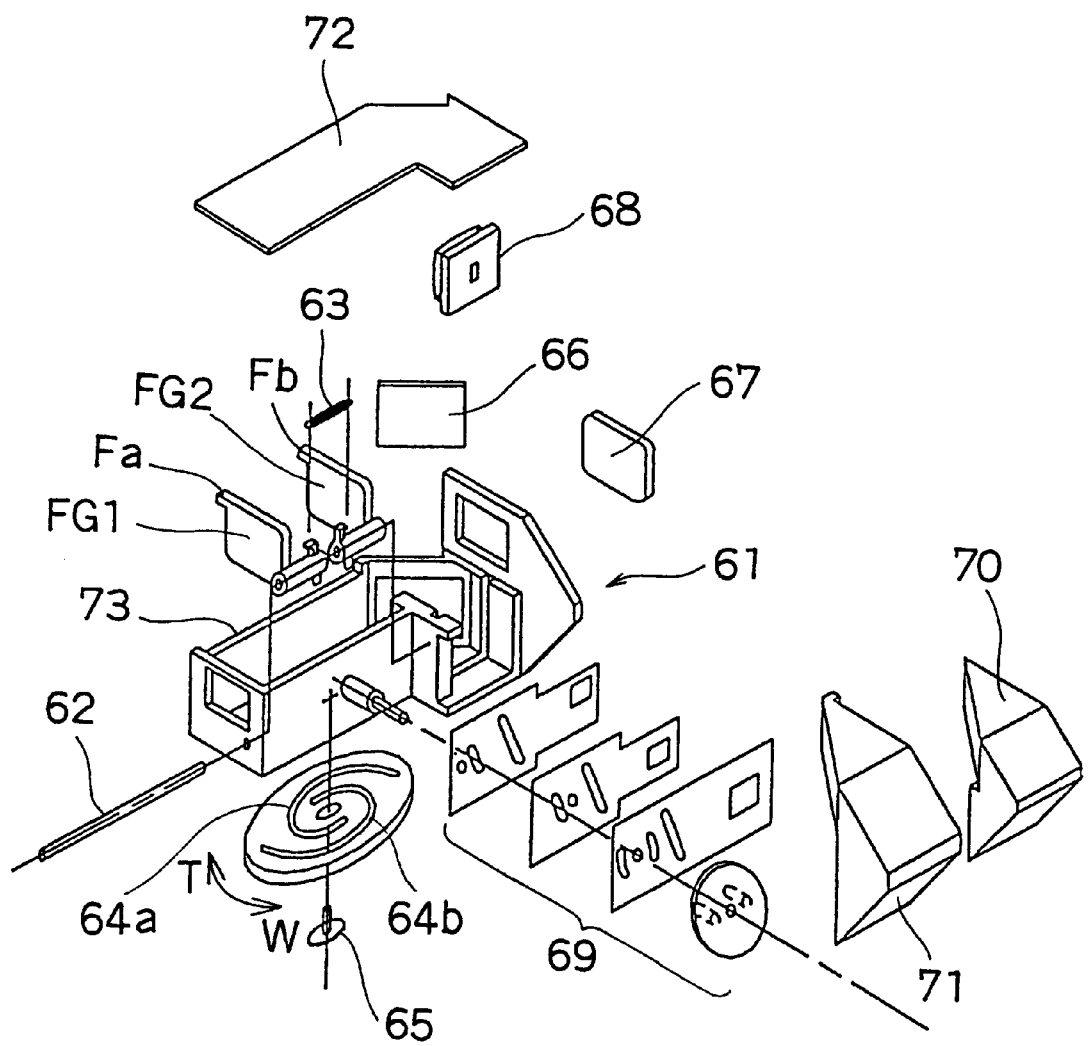
FIG. 17 is an exploded perspective view of the zoom viewfinder, illustrating its structure.

FIG. 17 is an exploded perspective view of the zoom viewfinder used in the embodiment under discussion, illustrating its structure. As shown in this figure, along the length of an approximately L-shaped and box-shaped base 61, viewfinder zoom lenses FG1 and FG2 are arranged one behind the other along the optical axis. The viewfinder zoom lenses FG1 and FG2 are fitted on a guide shaft 62 so as to be slidable along the optical axis, and are loaded by a spring 63 with force that keeps them pulled toward each other. On the bottom surface (under side) of the base 61, a rotary cam plate 64 is rotatably fitted with a stopper pin 65. The rotary cam plate 64 has cam grooves 64*a* and 64*b* formed on its top surface, around its rotation center. The viewfinder zoom lenses FG1 and FG2 have projections formed so as to protrude downward therefrom, and these projections engage with the above cam grooves 64*a* and 64*b* respectively, thus achieving cam couplings.

Moreover, the base 61 is, in predetermined positions thereof, fitted with a mirror 66, an eyepiece lens 67, and a condenser lens 68. Furthermore, the base 61 is, on one side, fitted with a frame shape switching mechanism 69 for switching the shape of the viewfinder frame between C, H, and P (classic, high-vision, and panorama) sizes. On this mechanism 69, a prism base 71, with an inverting prism 70 housed inside, is fitted from the side. Lastly, the base 61 is fitted with a cover 72 on its top.

As the driving gear 24 of the zoom lens barrel rotates, the rotary cam plate 64 rotates together in the direction indicated by arrow T (i.e. toward the telephoto end) or in the direction indicated by arrow W (toward the wide-angle end). This causes the viewfinder zoom lenses FG1 ad FG2 to move closer to each other or away from each other along the optical axis. In this way, the angle of view of the viewfinder is varied as zooming is performed. The light coming from the object, after entering the viewfinder, passes through the viewfinder zoom lenses FG1 and FG2, is reflected by the mirror 66, passes through the condenser lens 68 and the frame shape switching mechanism 69, is reflected by the inverting prism 70, and then passes though the eyepiece lens 67 to reach the observer's eye.

The viewfinder zoom lenses FG1 and FG2 each have, at one corner thereof, a guide projection formed so as to protrude sideways. These guide projections are slid along a rail surface 73 provided in the base 61, and meanwhile they are kept pressed against it by a resilient member (not shown). This prevents rotation of the viewfinder zoom lenses FG1 and FG2, and also helps correct parallax, as will be described later.

Figure 18:
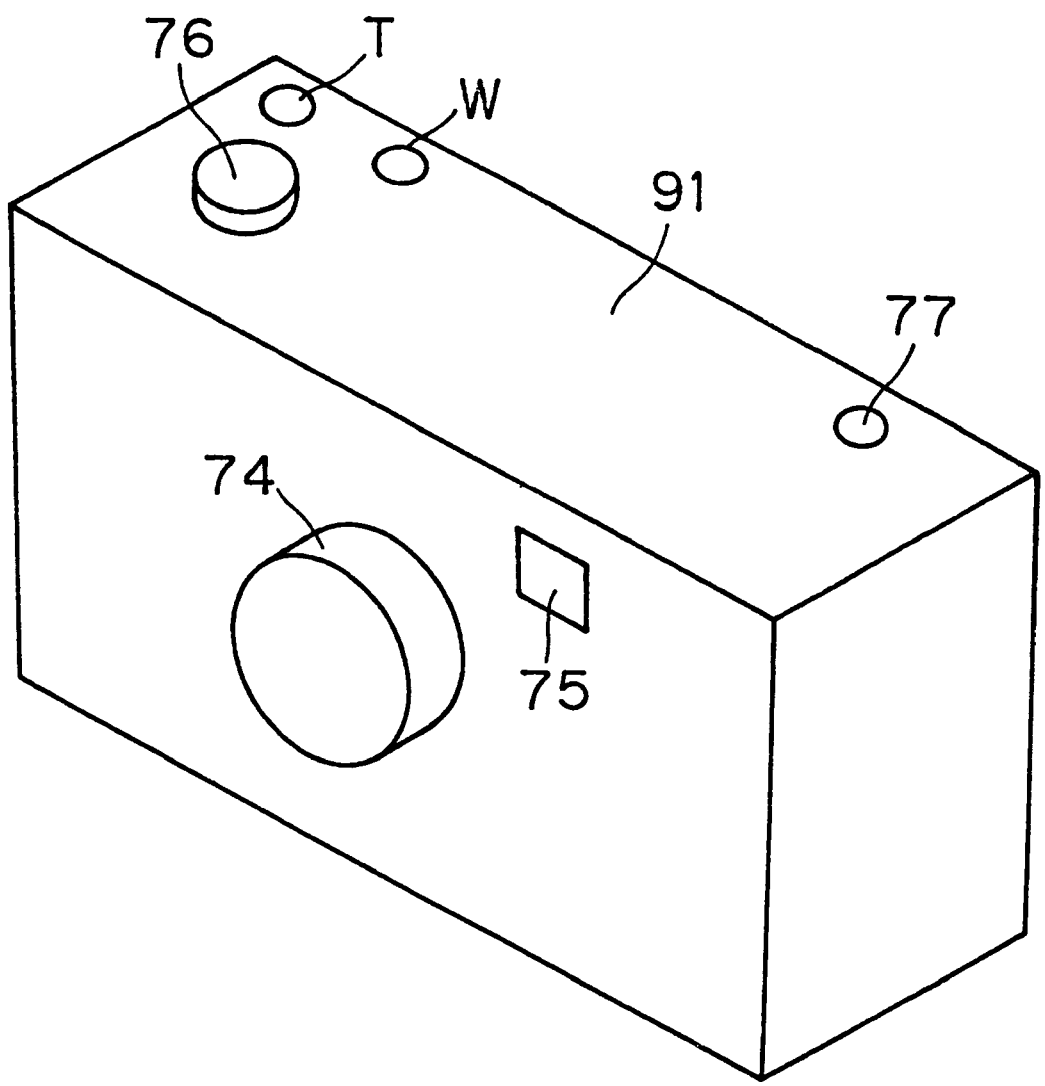
FIG. 18 is a perspective view schematically illustrating the appearance of a lensshutter camera of the embodiment.

FIG. 18 is a perspective view schematically illustrating the appearance of a lens-shutter camera of the embodiment. In this figure, reference numeral 74 represents the zoom lens barrel; reference numeral 75 represents a viewfinder widow; reference numeral 76 represents the release switch mentioned previously; reference symbols T and W respectively represent the telephoto and wide-angle zoom switches mentioned previously. Reference numeral 77 represents a mode selection switch, which is used to switch the shooting mode between normal, macro, and landscape modes.

Figure 19:
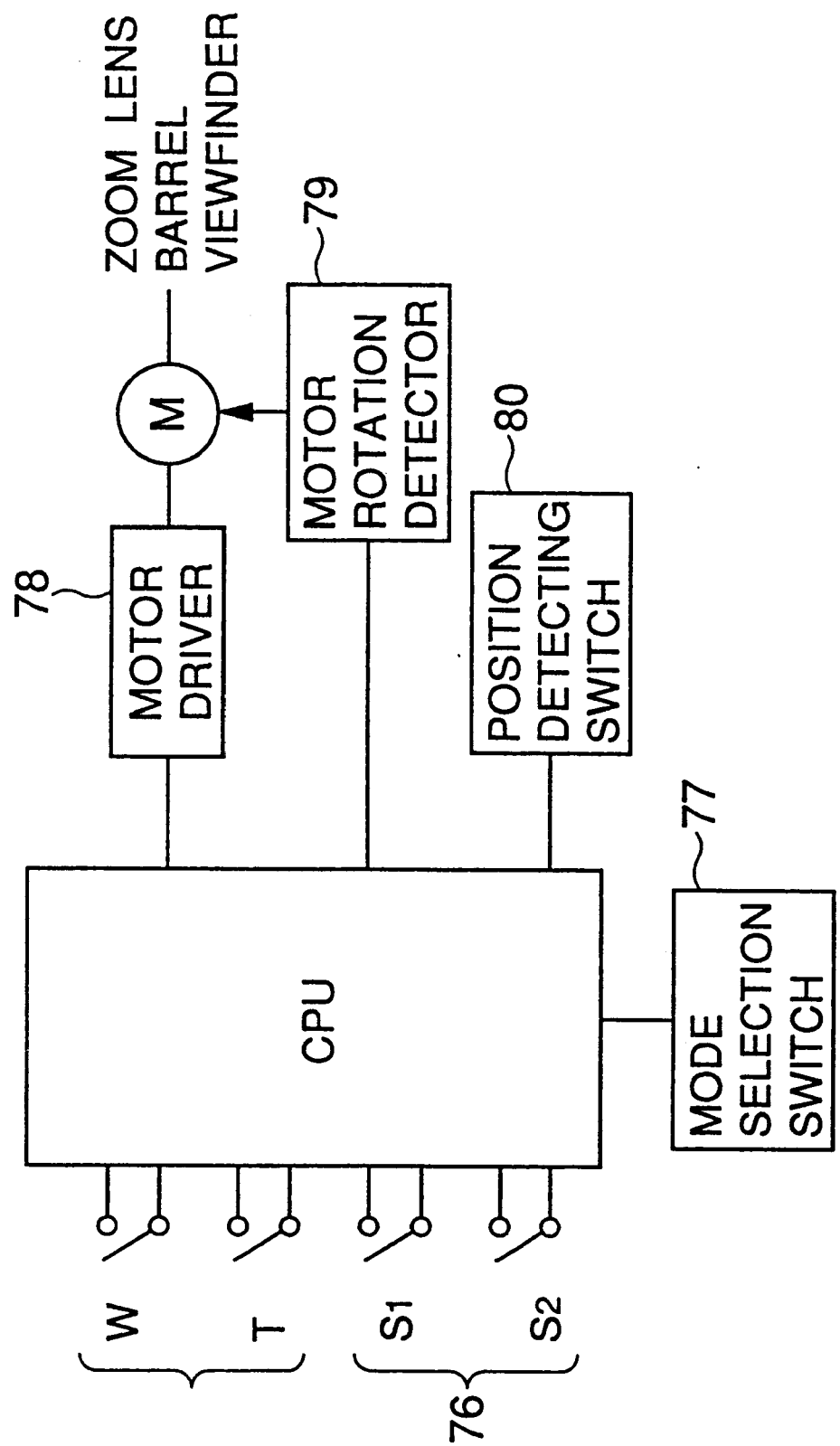
FIG. 19 is a block diagram illustrating the control system of the lens shutter camera of the embodiment.

FIG. 19 is a block diagram illustrating the control system of this lens shutter camera. In this figure, CPU represents a controller that is realized, for example, by the use of a microcomputer. The release switch 76, the telephoto zoom switch T, the wide-angle zoom switch W, and the mode selection switch 77 are connected to this controller. The release switch 76 is so designed that it can be set in either of two positions S1 and S2 in accordance with whether it is pressed halfway or fully in. The CPU transmits a command to a motor driver 78, which then drives a motor M to rotate and thereby drives the zoom lens barrel and the viewfinder.

In addition, the rotation of the motor M is transmitted to a wheel (not shown) that has a plurality of radially extending blades and that is disposed in a position where one after another of those blades intercepts the light beam of a photointerruptor (not shown). How many times the light beam is intercepted in a unit period is detected, as indicating the amount of rotation of the motor, by a motor rotation detector 79, and is fed to the CPU. On the other hand, the current position of the zoom lens barrel is detected by a position detecting switch 80, which will be described later, and is also fed to the CPU. These components enable the CPU to control the viewfinder and the zoom lens barrel as will be described later.

Figure 20A:
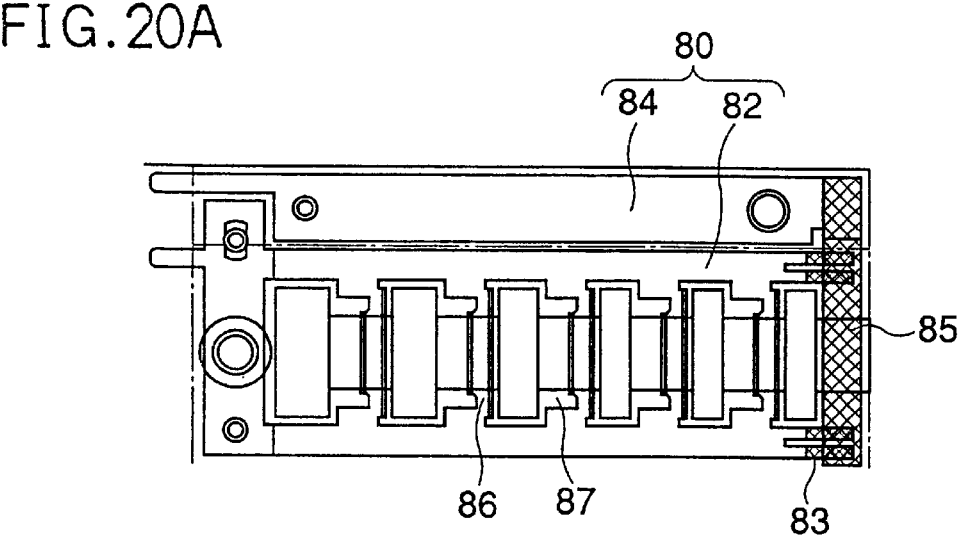
FIGS. 20A and 20B are diagrams illustrating how a position detecting switch is incorporated in the zoom lens barrel of the embodiment.
Figure 20B:
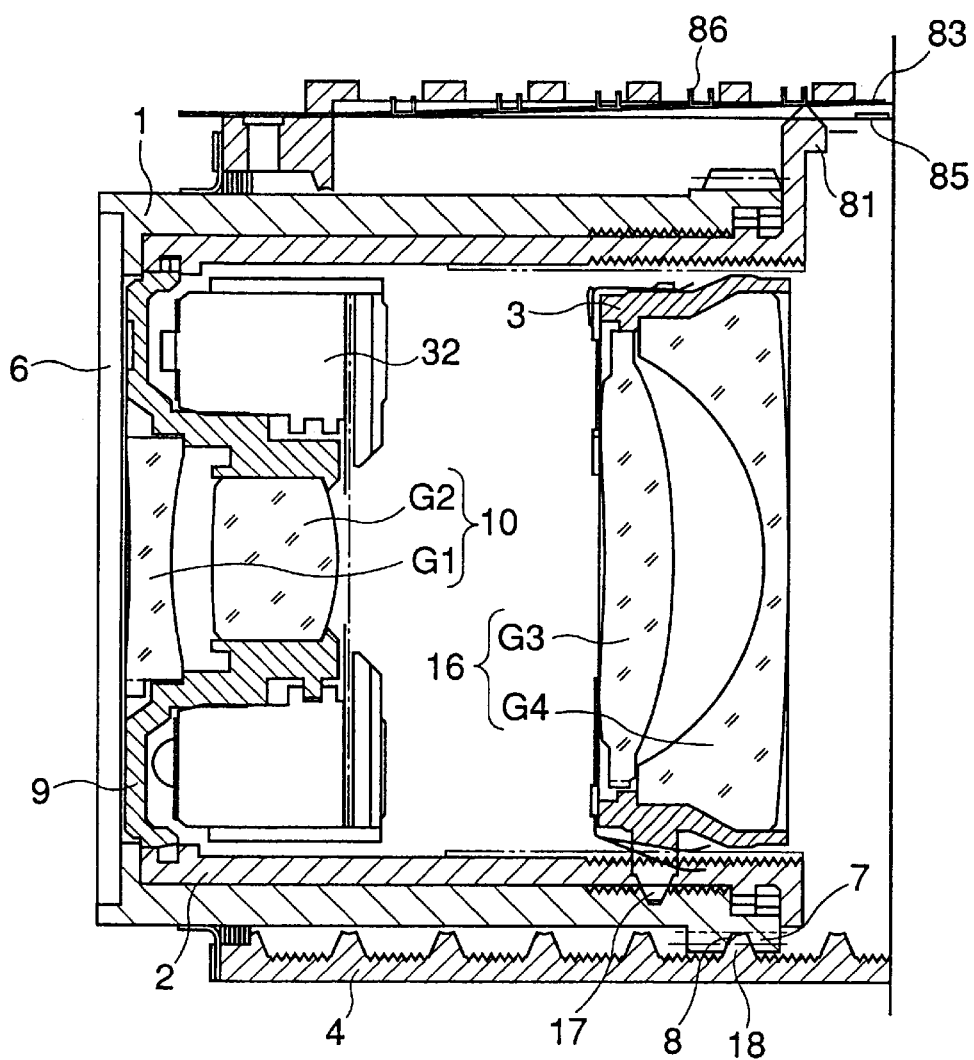

FIGS. 20A and 20B are diagrams illustrating how the position detecting switch 80 is incorporated in the zoom lens barrel of the embodiment, with FIG. 20A showing a plan view and FIG. 20B showing a vertical section as seen from the side. The structure of the zoom lens barrel itself is substantially the same as in FIG. 5, except that, in FIG. 20, the stationary barrel 4 has its topmost portion cut out along the optical axis so as to accommodate the position detecting switch 80.

The position detecting switch 80 is composed of a first armature 82 and a second armature 84, each arranged parallel to the stationary barrel 4. As shown in FIG. 20A, the first armature 82 is ladder-shaped, and has a plurality of openings 87 and rungs 86 arranged alternately along the optical axis. As shown in FIG. 20B, under these openings 87 and rungs 86, a switch projection 81 formed on the straight-movable barrel 2 moves together with the straight-movable barrel 2 itself. When the switch projection 81 comes under one of the rungs 86, the first armature 82 is pressed upward, and its tail end 83 separates from the tail end 85 of the second armature 84, bringing the switch 80 as a whole into a non-conducting state.

By contrast, when the switch projection 81 enters one of the openings 87, the first armature 82 returns to its original position, and makes contact with the second armature 84, bringing the switch 80 as a whole into a conducting state. The rungs 86 and openings 87 are so arranged as to correspond to the portions used for zooming and those used for focusing, shown in FIG. 15, of the zoom lens barrel.

Figure 21:
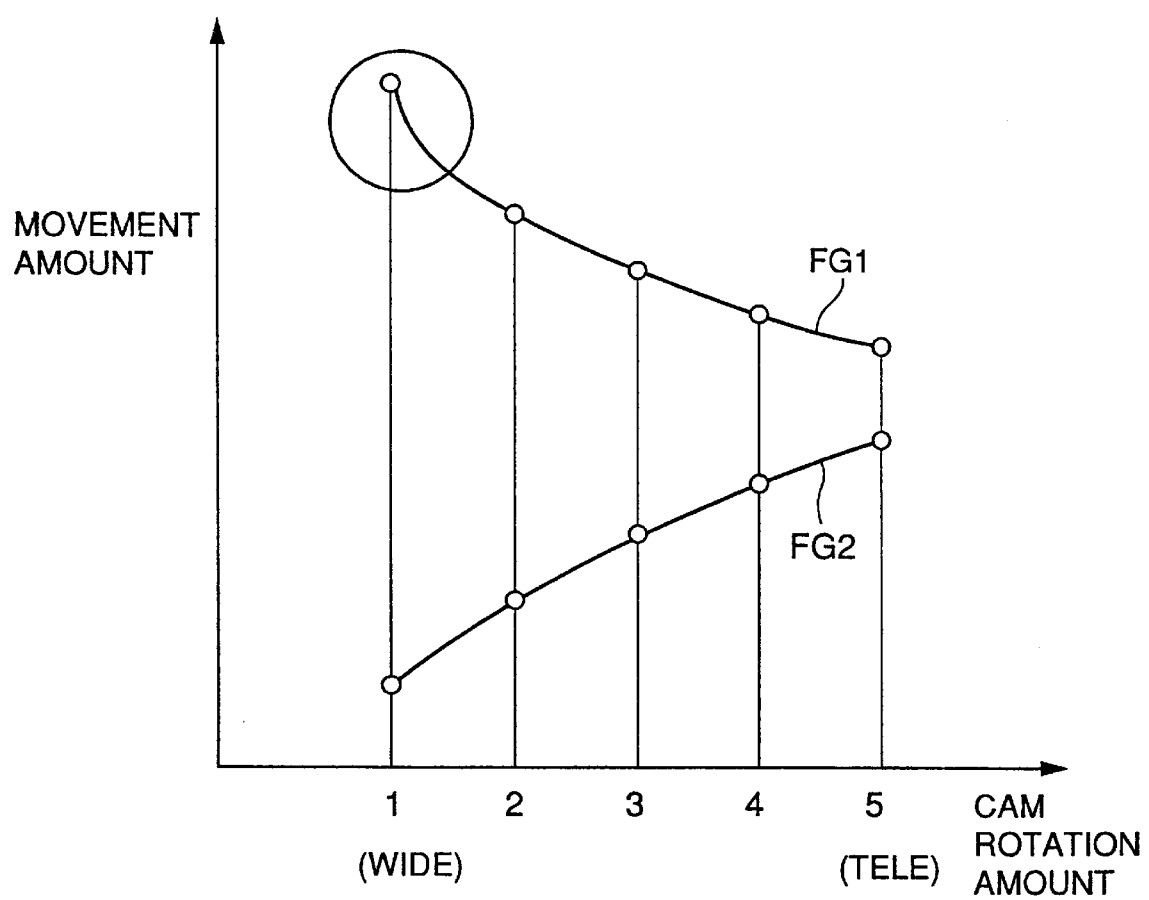
FIG. 21 is a diagram illustrating the viewfinder cam curves of the cams used in the zoom viewfinder shown in FIG. 17.

FIG. 21 is a diagram illustrating the viewfinder cam curves of the cams used in the zoom viewfinder shown in FIG. 17. The curves shown here assume that the first lens component 10 of the taking optical system (i.e. the zoom lens barrel) is driven linearly, that is, in such a way that the amount of linear movement is proportional to the amount of rotation. In FIG. 21, the amount of rotation of the rotary cam plate 64 is taken along the horizontal axis, and the amount of movement of the viewfinder zoom lenses (FG1 and FG2) is taken along the vertical axis. The FIGS. 1 to 5 marked along the horizontal axis represent the zoom positions provided between the wide-angle end and the telephoto end to achieve step zooming. Zooming is not stopped in any intermediate position between those predetermined zoom positions, and thus no such intermediate position is used for confirmation of picture composition.

Figure 22:
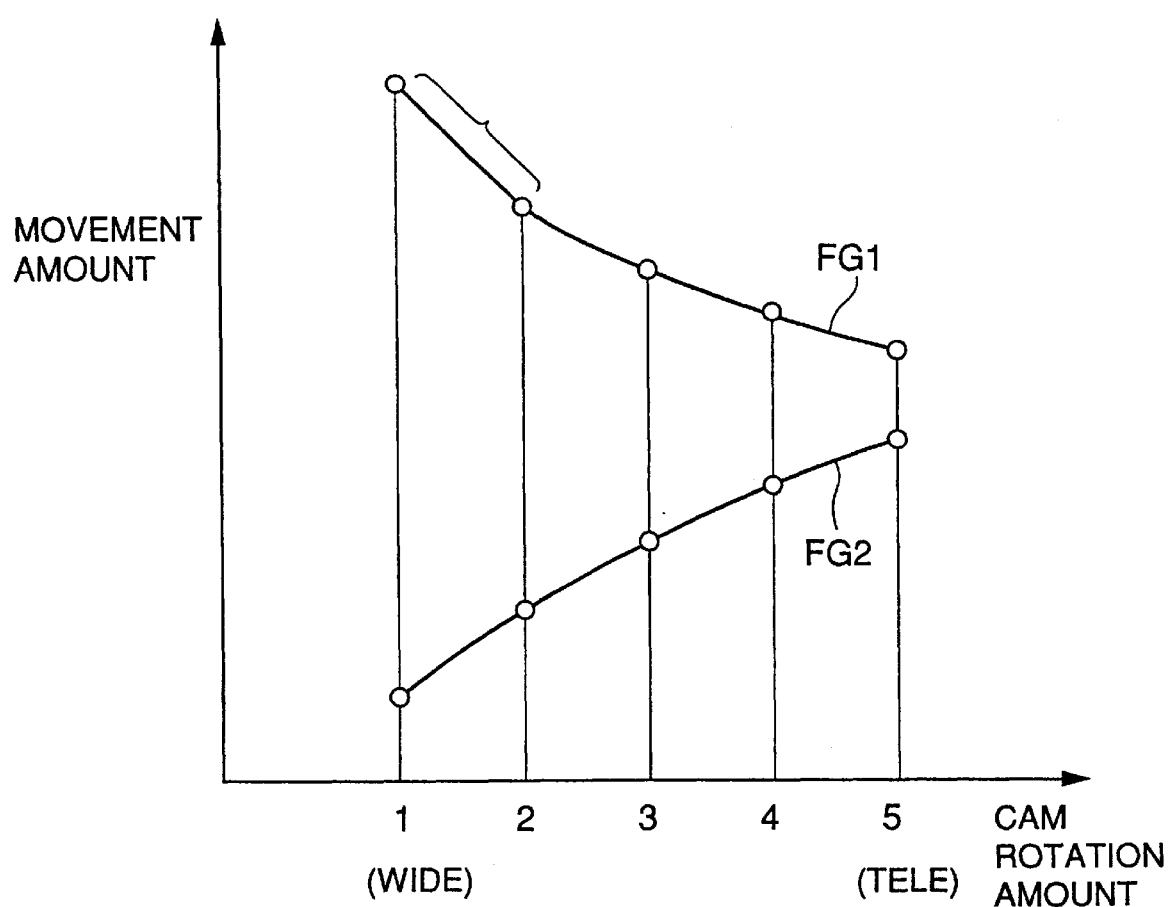
FIG. 22 is a diagram illustrating the viewfinder cam curves of the cams used in the zoom viewfinder shown in FIG. 17, with a portion of the cam curves smoothed.

In the taking optical system, the zoom curve is so determined as to be convenient to the zoom lens barrel. Therefore, if the viewfinder cam curves are determined in accordance with the zooming movement of the taking optical system, when zooming is performed from position 1 to position 2, the pressure angle is excessively great in the encircled portion of the cam curve of the cam that drives FG1. This requires an unduly large torque to drive the viewfinder zoom lenses, and may thus cause their malfunctioning, eventually causing shakes in the viewfinder image and other inconveniences. To avoid this, it is preferable, as indicated by a brace in FIG. 22, to make as straight as possible the portion between zoom positions 1 and 2 of the viewfinder cam curve for FG1. This helps smooth the variation of the pressure angle and thereby remove from the cam curves any portion where the pressure angle is unduly great.

Since no intermediate position between the predetermined zoom positions is used for confirmation of picture composition, the zoom movement of the viewfinder can be determined freely, i.e. independently of the zoom movement of the zoom lens barrel, between those predetermined zoom positions. Thus, making a portion of the cam curves straight as described above does not cause any problem at all in practical use. The movement of FG2 is so determined that FG2 moves in accordance with the movement of FG1 while keeping the dioptric power of the viewfinder constant.

Figure 23:
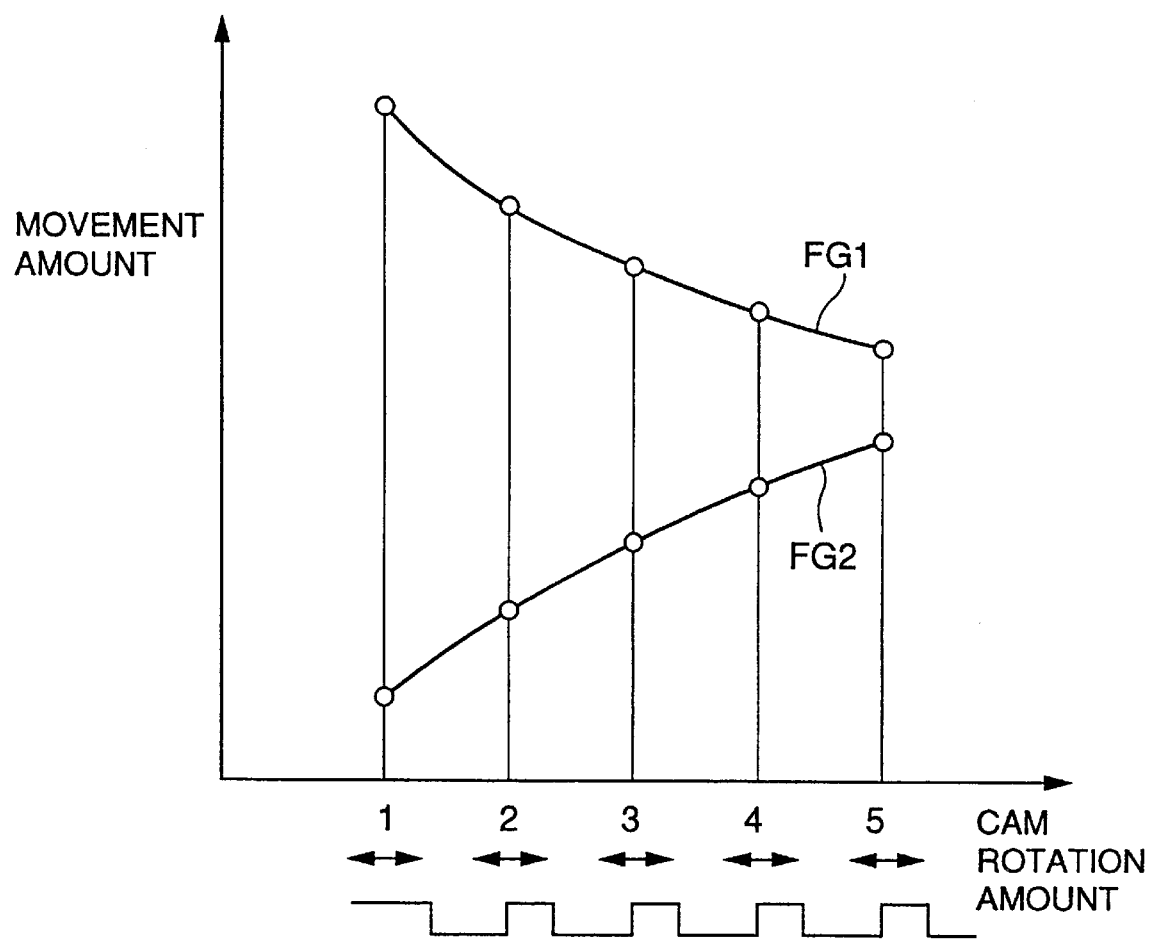
FIG. 23 is a diagram illustrating, in comparison with the viewfinder cam curves, the ranges within which the individual zoom positions can be adjusted.

FIG. 23 is a diagram illustrating, in comparison with the viewfinder cam curves that show the positions in which FG1 and FG2 are normally located in each zoom position, the ranges within which the individual zoom positions can be adjusted. In a lens barrel like that of the embodiment in which zooming and focusing are performed by the use of a cam provided in the lens barrel, during shooting, focusing is performed by driving the lens barrel relative to the position detecting switch 80. Accordingly, the position in which the lens barrel is stopped before the start of a shooting sequence does not affect how shooting will actually be performed. Therefore, as far as the taking optical system is concerned, the zoom positions may be determined freely as long as the switch 80, which serves as a reference point, can be detected in each of those zoom positions.

For this reason, for each of the zoom positions 1 to 5, a zoom position adjustment range is secured to make it possible to compensate for a deviation of the viewing field due to errors inevitable when the zoom lens barrel and the viewfinder are assembled together, errors tolerated in the constituent components, and other factors. By adjusting the stand-by position of the zoom lens barrel before the start of a shooting sequence (focusing), it is possible to optimize the ratio of the viewing field of the viewfinder. In addition, between zooming from the wide-angle side to the telephoto side and zooming in the opposite direction, the zoom positions vary slightly because of the backlash present between the gears and other factors. This can also be compensated for by adjusting the zoom positions so that the viewing field will be kept in a fixed position in all of the zoom positions.

Figure 24:
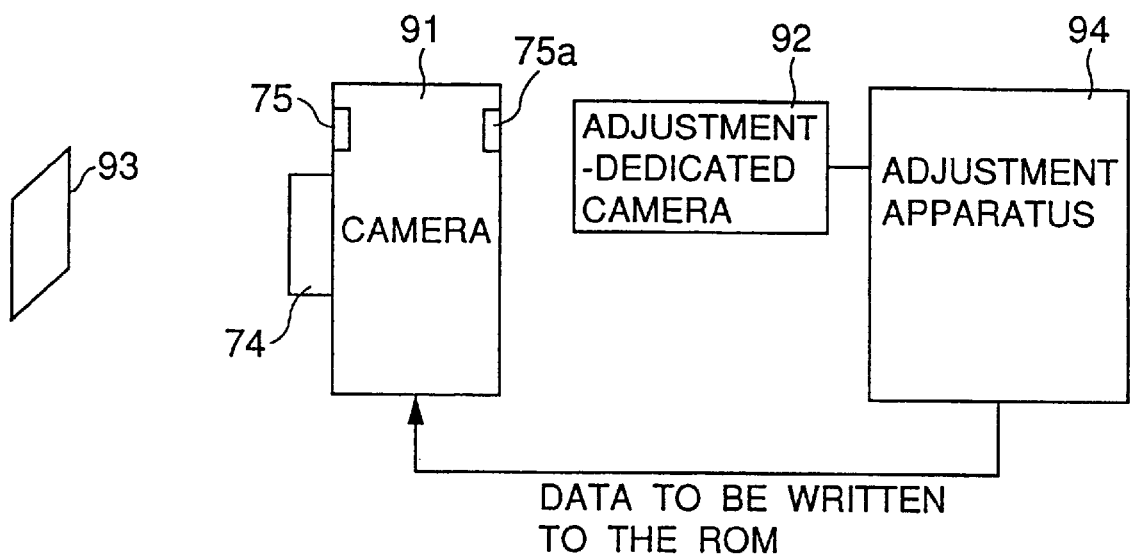
FIG. 24 is a block diagram illustrating how the zoom positions are adjusted.
Figure 25:
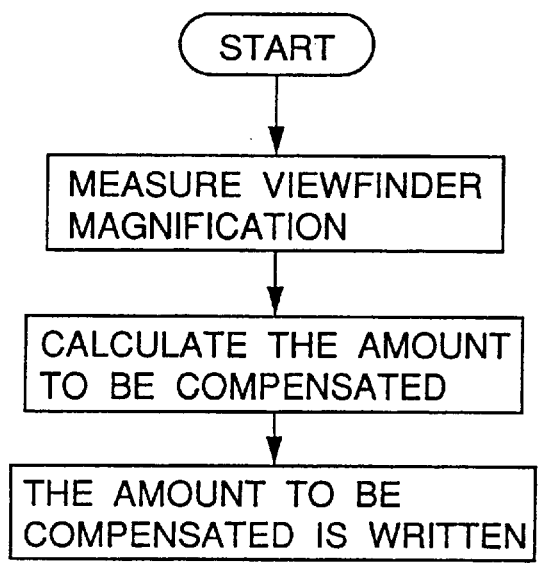
FIG. 25 is a flow chart illustrating the procedure for adjusting the zoom positions.

FIG. 24 is a block diagram illustrating how the zoom positions are adjusted. As shown in this figure, by the use of an adjustment-dedicated camera 92, a chart 93 is observed through the camera 91, i.e. viewed from its viewfinder eyepiece 75a through its viewfinder window 75. The obtained data is fed to an adjustment apparatus 94, which calculates the amount to be compensated for and then writes it to the ROM provided inside the camera 91. In this way, the positions in which the zoom lens barrel 74 can be stopped are adjusted. More specifically, as illustrated in the flow chart shown in FIG. 25, first, the viewfinder magnification is measured, and then the amount by which the zoom positions are to be compensated is calculated and written to the ROM. This may be done for individual cameras when they are manufactured, or may be done collectively by writing identical data in all of the cameras that are assembled from components produced by the use of a single die on the assumption that such cameras are identical with each other.

Figure 26:
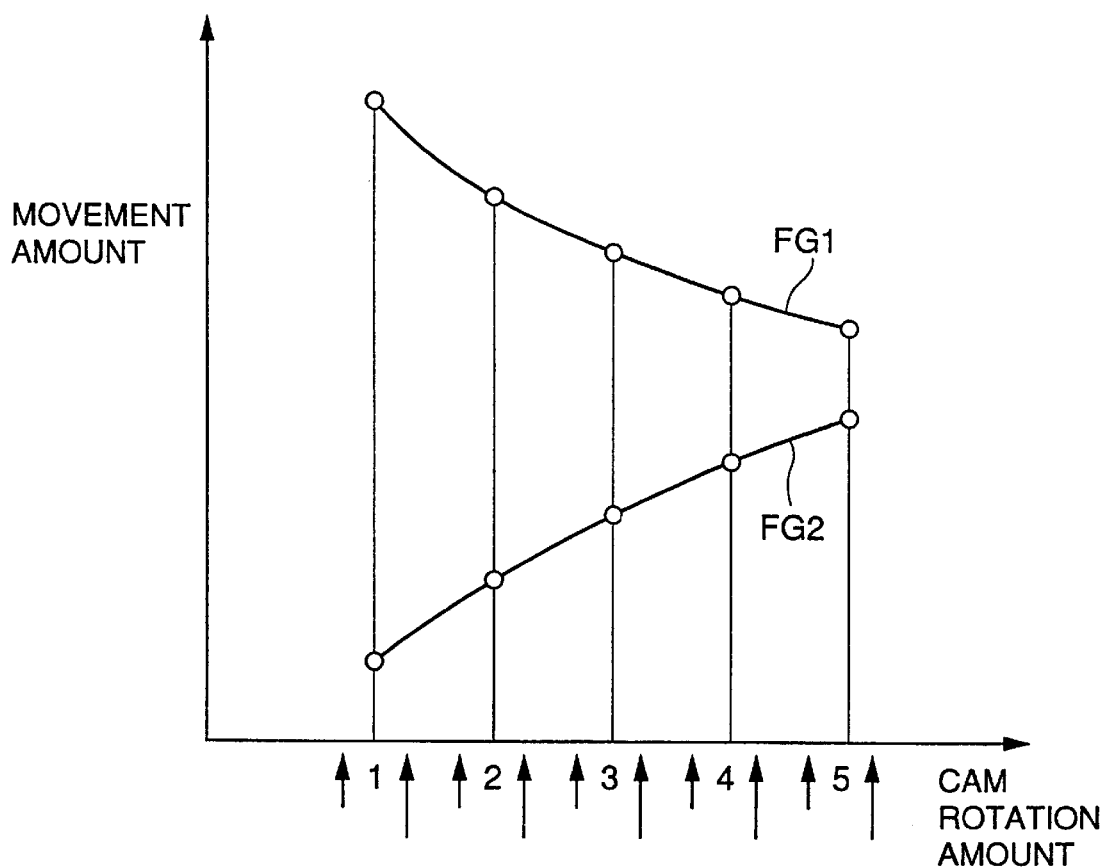
FIG. 26 is a diagram illustrating, in comparison with the viewfinder cam curves, the stand-by positions of the zoom lens barrel.

FIG. 26 is a diagram illustrating, in comparison with the viewfinder cam curves that show the positions in which FG1 and FG2 are normally located in each zoom position, the stand-by positions of the zoom lens barrel for different shooting modes. In macro shooting with the focus set at a close distance, the area that is covered in a shot is narrower than in ordinary shooting, Therefore, in a whole-range macro mode, to display the actually covered area within the viewing field of the viewfinder, the stand-by positions are located on the telephoto side of each of the ordinary step zoom positions, as indicated by long arrows. By contrast, in landscape shooting with the focus set at infinity, the area that is covered in a shot is wider than in ordinary shooting. Therefore, in a whole-range landscape mode, to display the actually covered area within the viewing field of the viewfinder, the stand-by positions are located on the wide-angle side of each of the ordinary step zoom positions, as indicated by short arrows.

Figure 27:
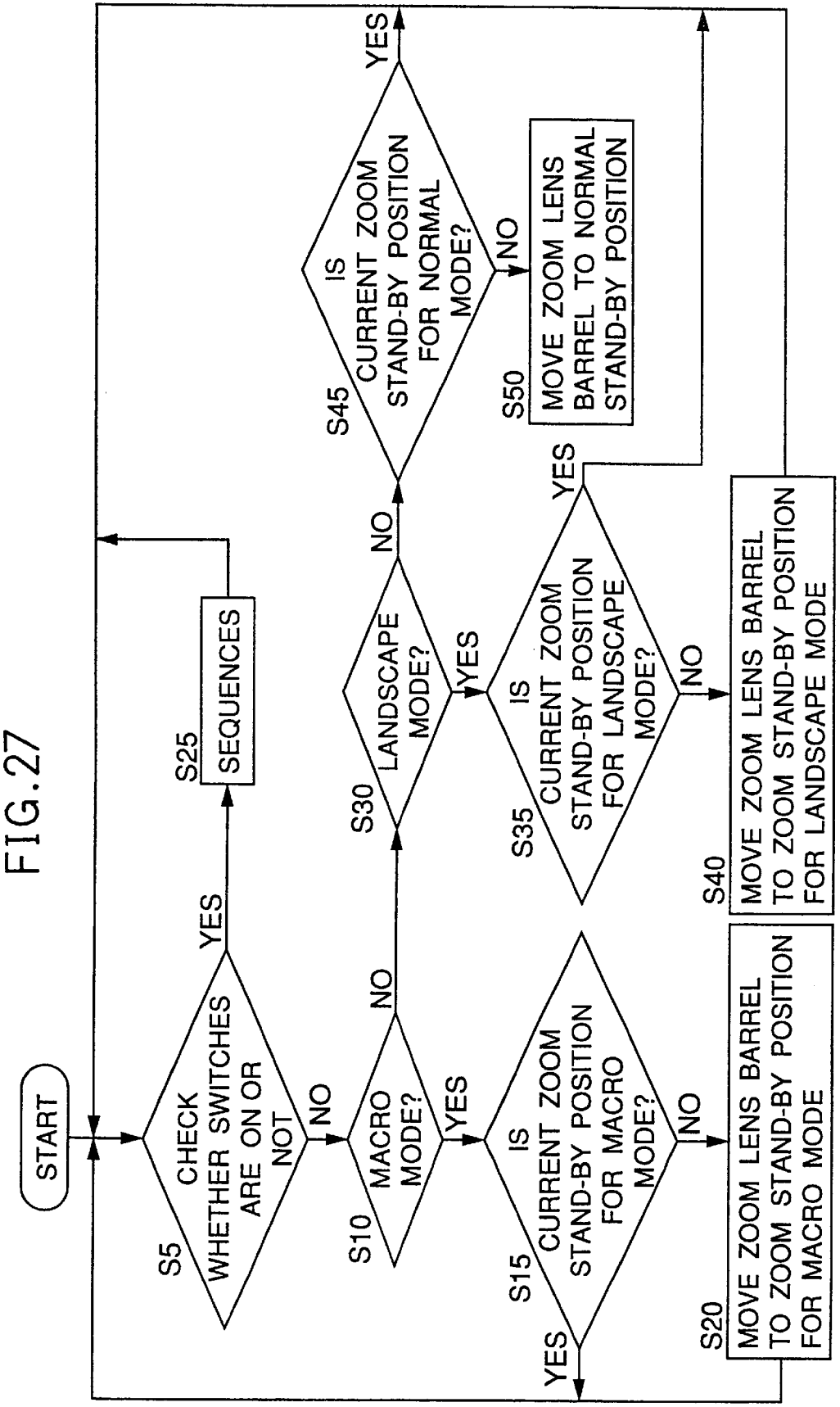
FIG. 27 is a flow chart illustrating the procedure for bringing the camera into a zoom stand-by state.

That is, when the ratio of the viewing field is adjusted, in the macro mode, the stand-by positions before the start of a shooting sequence (focusing) is shifted toward the telephoto side, and, in the landscape mode, they are shifted toward the wide-angle end. FIG. 27 is a flow chart illustrating the procedure for bringing the lens barrel into a zoom stand-by state. At the start of shooting, first, in step S5, whether one of the various switches provided, such as the release switch 76 and the zoom switches T and W shown in FIG. 18, is on or not is checked, and, if not, the procedure proceeds to step S10. In step S10, whether the macro mode is selected by the mode selection switch 77 shown in FIG. 18 or not is checked, and, if so, the procedure proceeds to step S15.

In step S15, whether the zoom stand-by positions are currently set to those for the macro mode or not is checked, and, if not, the procedure returns to step S20, where the zoom lens barrel is moved to one of the zoom stand-by positions for the macro mode, and then the procedure returns to its starting point. If, in step S15, the zoom stand-by positions are set to those for the macro mode, the procedure directly returns to its starting point. If, in step S5 above, one of the various switches is found to be on, then the procedure returns to step S25, where an appropriate sequence of operations is performed, and then the procedure returns to its starting point. If the sequence performed there is a zooming sequence, the lens barrel is stopped in a position that conforms to the currently selected mode. If, in step S10 above, the macro mode is not selected, then the procedure proceeds to step S30.

In step S30, whether the landscape mode is selected by the mode selection switch 77 or not is checked, and, if so, the procedure proceeds to step S35. In step S35, whether the zoom stand-by positions are currently set to those for the landscape mode or not is checked, and, if not, the procedure returns to step S40, where the zoom lens barrel is moved to one of the zoom stand-by positions for the landscape mode, and then the procedure returns to its starting point. If, in step S35, the zoom standby positions are set to those for the landscape mode, the procedure directly returns to its starting point. If, in step S30 above, the landscape mode is not selected, then the procedure proceeds to step S45.

In step S45, whether the zoom stand-by positions are currently set to those for the normal mode or not is checked, and, if not, the procedure proceeds to step S50, where the zoom lens barrel is moved to one of the normal zoom stand-by positions, and then the procedure returns to its starting point. If, in step S45, the zoom stand-by positions are currently set to those for the normal mode, the procedure directly returns to its starting point.

Figure 28:
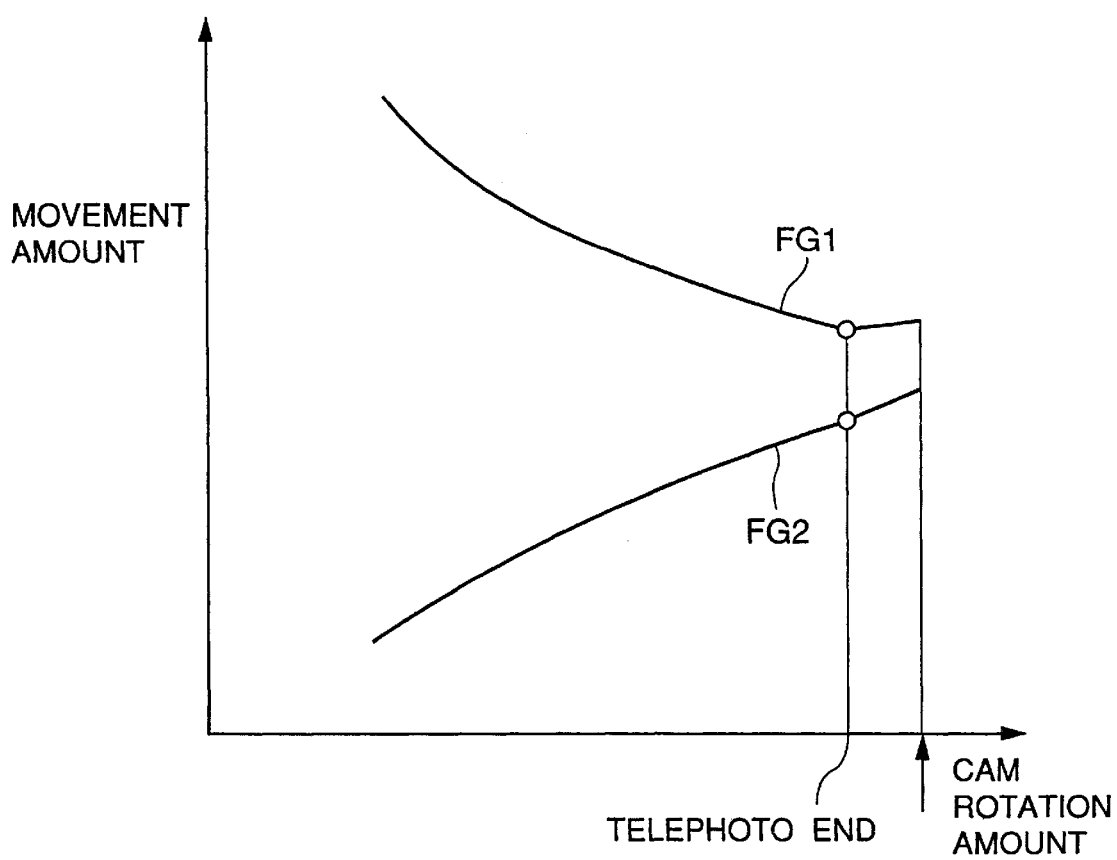
FIG. 28 is a diagram showing the viewfinder cam curves for a telemacro configuration.

As opposed to the case where the switching of the shooting mode affects the entire zoom range, in cases where the macro mode is available only at the telephoto end, i.e. in a so-called telemacro configuration, the viewfinder cam curves are set as shown in FIG. 28. In this case, it is possible, when the lens barrel is driven from the normal telephoto end to the telemacro position as indicated by the arrow, to make the viewing field narrower by the action of the viewfinder cams and simultaneously adjust the dioptric power to a close distance.

Figure 29A:
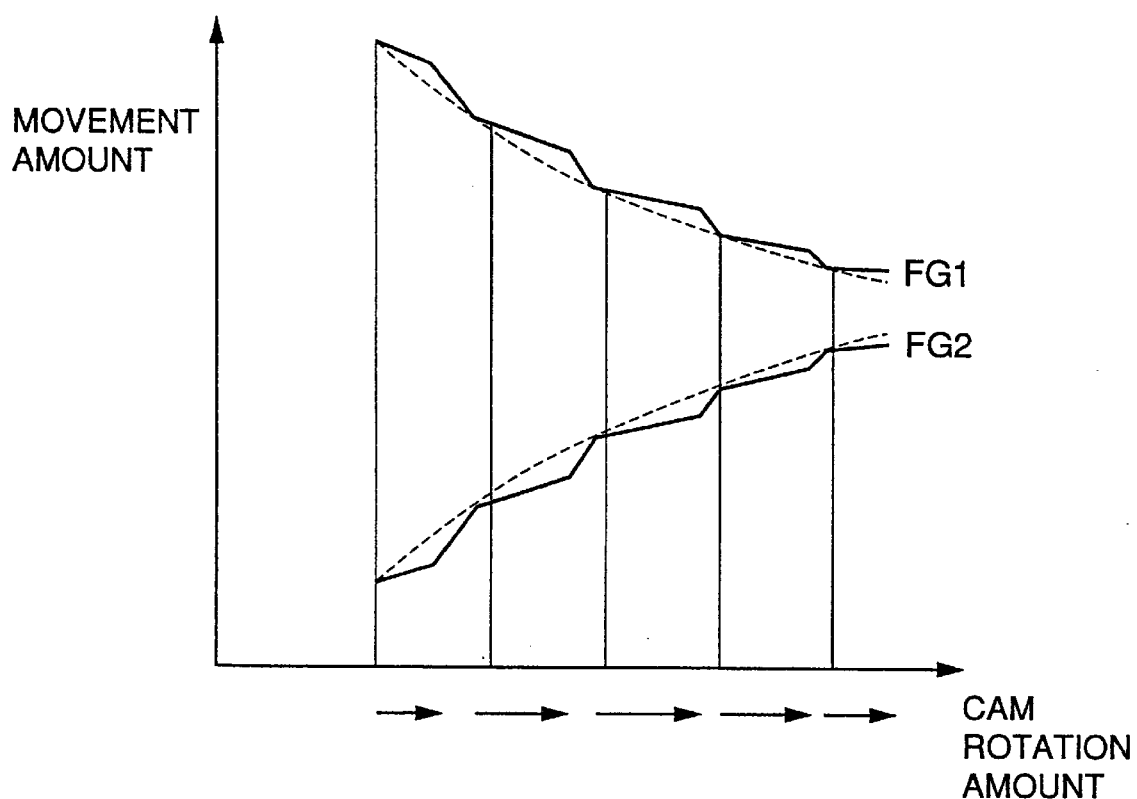
FIG. 29A and 29B are diagrams illustrating examples in which another kind of adjustment is performed in synchronism with the focusing movement of the zoom lens barrel.

FIG. 29A is a diagram showing the viewfinder cam curves for cases where the area of the viewing field is adjusted in accordance with the area actually covered by a shot, or the dioptric power is adjusted in accordance with the shooting distance, in synchronism with the focusing movement of the zoom lens barrel. In this figure, broken lines represent the original zoom curves, and solid lines represent the viewfinder cam curves of the embodiment. In general, in a taking lens, the shooting angle of view varies with the shooting distance (the position of focus). On the other hand, in the lens barrel/viewfinder system of the embodiment, as focusing is performed, the viewfinder cams are driven. Therefore, by designing the viewfinder cams in such a way that the angle of view or the dioptric power is varied in accordance with the shooting distance, it is possible to present images with a more accurate angle of view or dioptric power in the viewfinder.

Figure 29B:
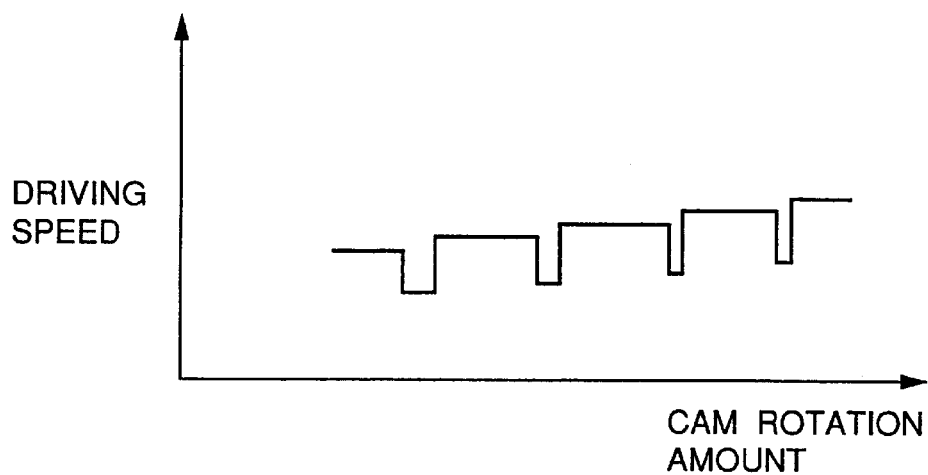

Moreover, as shown in FIG. 19, the release switch 76 is so designed that it can be set in either of two positions S1 and S2. Therefore, by performing focusing with S1 pressed halfway in, it is possible to determine picture composition with a more accurate viewing field area and with a more accurate dioptric power. However, in ordinary zooming, performing constant-speed zooming in this state causes discontinuous variation of the viewfinder magnification as is felt by the user as uncomfortable. This can be avoided by controlling the driving speed of the viewfinder zoom as shown in FIG. 29B so that the magnification will vary smoothly.

Figure 30:
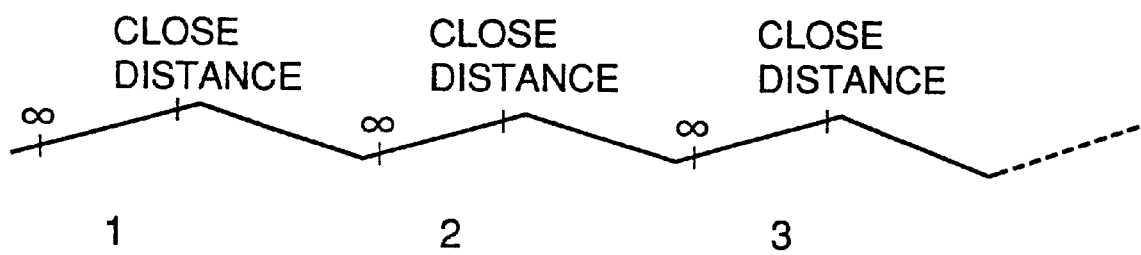
FIG. 30 is a diagram illustrating how the rail surface is formed in a wave-like shape.

Moreover, it is also possible to decenter the viewfinder lenses during focusing and thereby correct parallax. This can be achieved by forming the rail surface 73 shown in FIG. 17 in a wave-like shape as shown in FIG. 30. As the guide projection Fa (or Fb) of the viewfinder zoom lens FG1 (or FG2) slides along this rail surface 73, the viewfinder zoom lens FG1 (or FG2) is decentered by being rotated about the guide shaft according as focusing is performed from an infinite to a close distance in each of positions 1, 2, 3, . . . , and this makes it possible to correct, in accordance with the shooting distance, the parallax occurring between the zoom lens barrel and the viewfinder.

Figure 31:
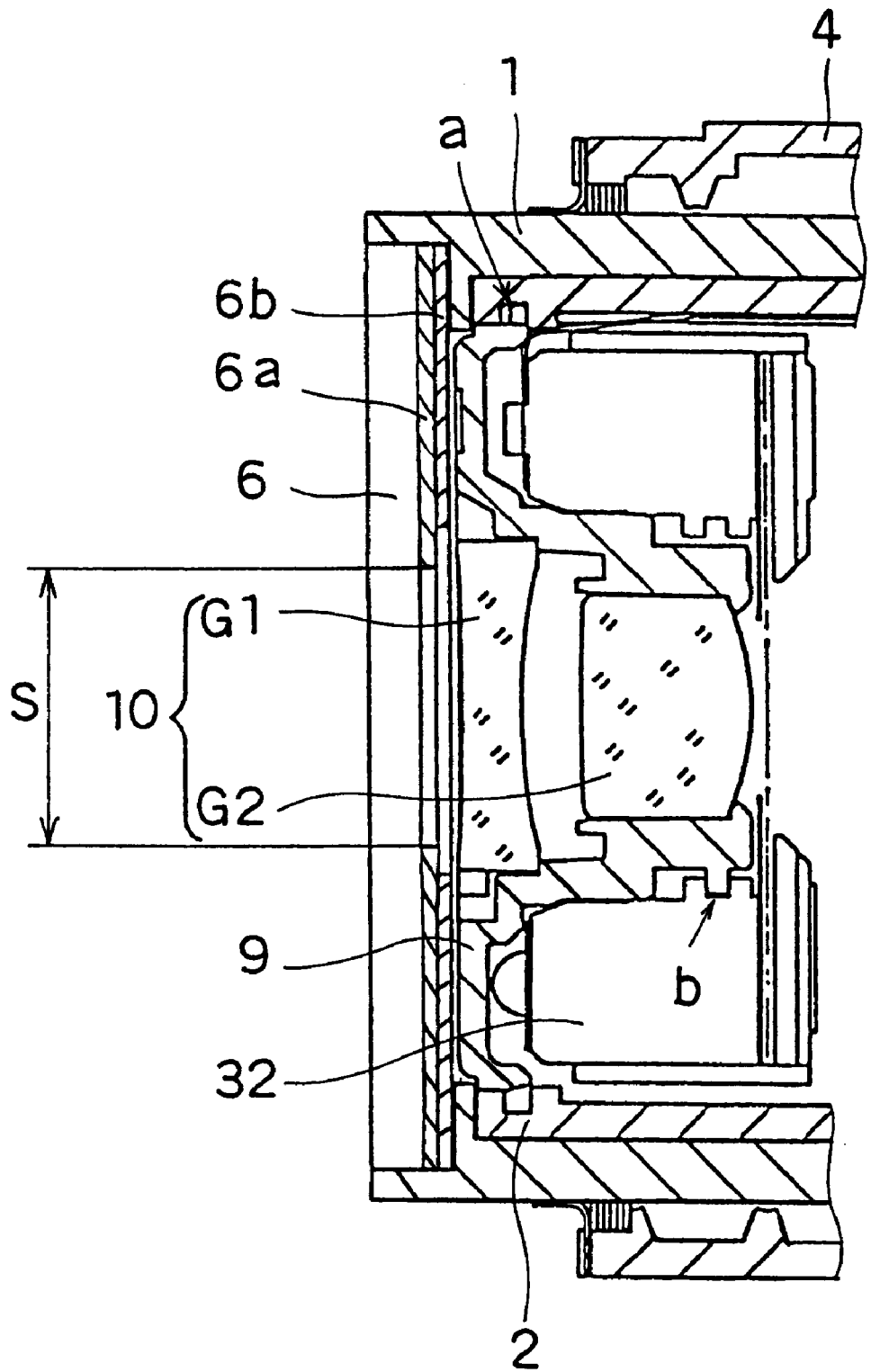
FIG. 31 is a detailed vertical section of the front portion of the lens barrel as seen from the side, illustrating an example in which the lens barrier is provided with additional functions.

The lens barrier 6 may be so designed as to function also as an aperture plate or a decorative sheet, as conventionally practiced. FIG. 31 is a detailed vertical section of the front portion of the lens barrel shown in FIG. 5 as seen from the side, illustrating an example in which the lens barrier 6 is provided with additional functions. Specifically, the lens barrier 6, which is fitted at the front end of the rotatable cam barrel 1, has, on the film side, i.e. on its side facing the lens (in short, on its back side), a back-side print pattern 6a formed in a ring-like shape. This back-side print pattern 6a serves to conceal the inner surfaces of the portions coupling the constituent components of the lens barrel together, and to give better appearances to the lens barrel. The back-side print pattern 6a has an optical aperture having an aperture diameter S formed at its center, i.e. around the optical axis. Thus, the lens barrier 6 functions also as an aperture plate and a decorative sheet as have conventionally been in wide use.

Figure 32A:
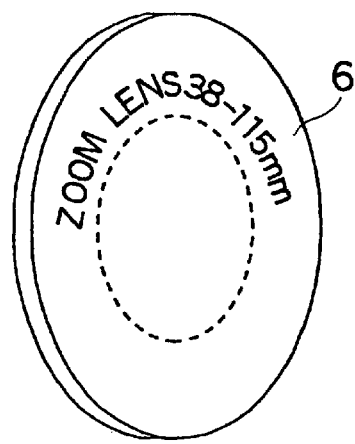
FIGS. 32A, 32B, and 32C are diagrams showing the appearance of the lens barrier provided with additional functions.
Figure 32B:
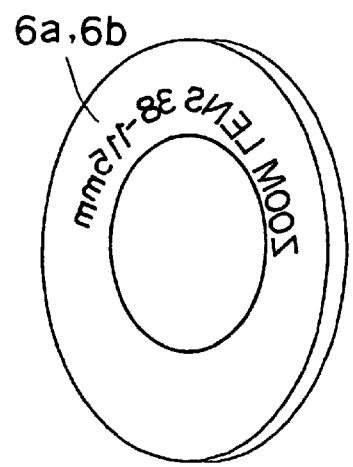
Figure 32C:
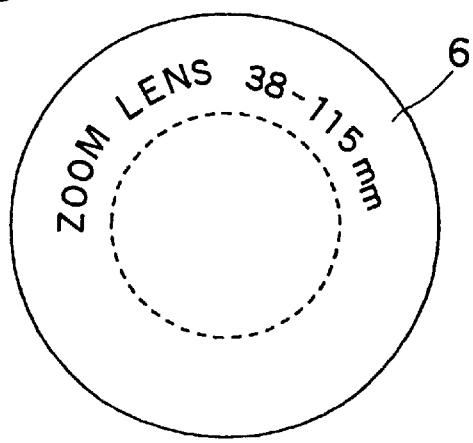
Figure 33:
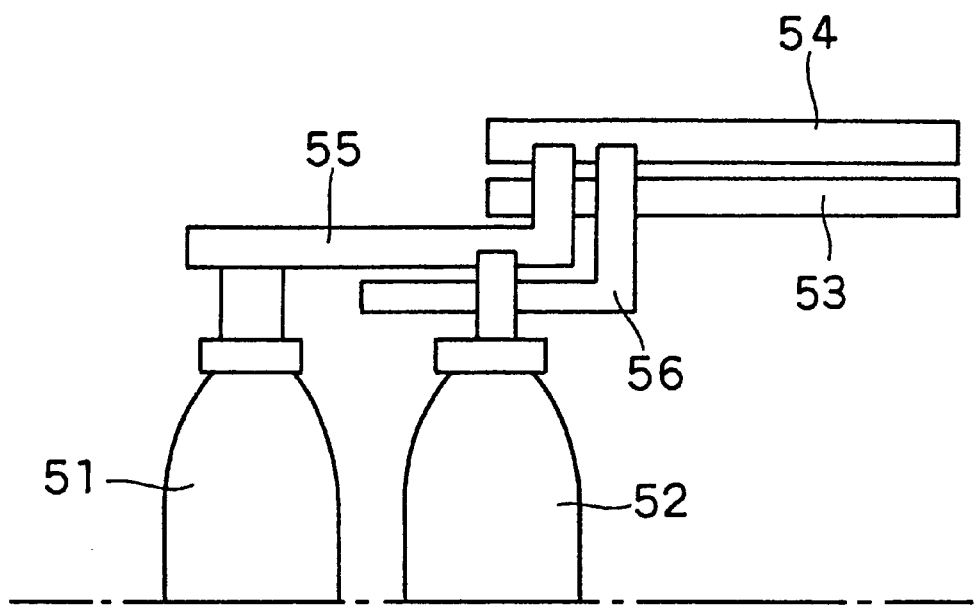
FIG. 33 schematically shows a vertical cross section of the conventional zoom lens barrel.

Moreover, the back-side print pattern 6a has sticky agent 6b applied to its film-side surface. This permits the lens barrier 6 to be attached to the rotatable cam barrel 1 by a one-touch operation. FIGS. 32A, 32B, and 32C are diagrams illustrating the appearance of the lens barrier 6 provided with additional functions, with FIG. 32A showing a front perspective view, FIG. 32B showing a rear perspective view, and FIG. 32C showing a front view. As shown in these figures, it is possible to mark, on the front surface of the lens barrier 6, or between the lens barrier 6 and the back-side print pattern 6a, a description of the lens such as "ZOOM LENS 38–115 mm", or a symbol or logotype of the manufacturer or model. This helps give still better appearances to the lens barrel. The above-described structure contributes to a reduced number of constituent components of the lens barrel, to a reduced number of its assembly steps, and to its miniaturization in particular along the optical axis. Note that, instead of forming a print pattern on the lens barrier 6, it is also possible to form a print pattern that serves as an aperture on a conventional decorative sheet.

The basic arrangement of the zoom lens barrel of the embodiment as claimed in claim 1 is schematically shown in FIG. 1, which is an exploded perspective view thereof As shown in FIG. 1, the straight-movable barrel 2 is fitted into the rotatable cam barrel 1 and is coupled thereto by a bayonet coupling. The second lens frame 3 (including the second lens component 16) is fitted inside the straight-movable barrel 2 and is coupled therethrough to the rotatable cam barrel 1 by a cam coupling. The rotatable cam barrel 1 is fitted into the stationary barrel 4 and is coupled thereto by a helicoid coupling. The stationary barrel 4 is fixed to the camera body 5 with a screw. The straight-movable barrel 2 has the first lens frame 9 (including the first lens component 10) fitted at its front end.

The basic arrangement of the zoom lens barrel as claimed in claim 2 is shown in FIG. 5, which is a vertical section thereof. As shown in FIG. 5, the straight-movable barrel 2 is fitted into the rotatable cam barrel 1 and is coupled thereto by a bayonet coupling at their rear ends. The basic arrangement of the zoom lens barrel of the embodiment as claimed in claim 3 is shown in FIG. 2, which is a perspective view thereof. As shown in FIG. 2, the rotatable cam barrel 1 has the cam grooves 29 carved so as not to penetrate through in its inner surface. When the second lens frame 3 (see FIG. 1) is fitted into the straight-movable barrel 2, the cam pins 17 of the second lens frame 3 engage, through the straight guide grooves 15 of the straight-movable barrel 2, with the above-mentioned cam grooves 29, thus achieving a cam coupling.

The basic arrangement of the zoom lens barrel as claimed in claim 4 is shown in, for example, FIG. 7. The bayonet hooks 28a, 28b, and 28c, which are formed in three positions around the inner surface of the rotatable cam barrel 1, are arranged so as to correspond to the clearances 14a, 14b, and 14c, respectively, that are formed in three positions around the outer edge of the bayonet flange 13, which is illustrated with broken lines, of the straight-movable barrel 2. These bayonet hooks 28a, 28b, and 28c are each differently shaped in their width and height so that disengagement of the straight-movable barrel 2 from the rotatable cam barrel 1 is avoided unless the bayonet hooks are positioned precisely at their corresponding clearances. Thus, even if the rotatable cam barrel 1 is designed to be rotatable through almost one complete turn (i.e. through more than 120°), the component barrels never disengage from each other, or incline with respect to each other.

The basic arrangement of the zoom lens barrel as claimed in claim 5 is shown in FIG. 15, which is an unfolded view thereof. As shown in FIG. 15, the rotatable cam barrel 1 has the cam grooves 29 formed in its inner surface. The braced portions of those cam grooves are used for focusing, and the remaining portions are used for zooming. That is, in this cam, the portions used for zooming and those used for focusing are arranged alternately.

As described heretofore, according to the present invention, it is possible to realize a compact and low-cost zoom lens barrel composed of as few barrels as possible in which a wide zoom range is achieved by the large-angle rotation of relevant components. In particular, according to the zoom lens barrel as claimed in claim 1, the zoom lens barrel employs only three barrels, which contributes, as compared with conventional zoom lens barrels, to miniaturization and reduction in costs of the zoom lens barrel. Moreover, a novel method for coupling the rotatable cam barrel to the straight-movable barrel makes it possible to secure a large rotation angle of the rotatable cam barrel.

According to the zoom lens barrel as claimed in claim 2, the rotatable cam barrel is placed outside the straight-movable barrel. Thus, external mechanical force applied to the rotatable cam barrel is transmitted, through the helicoid coupling, directly to the stationary barrel 4, and therefore it is possible to secure sufficient mechanical strength. According to the zoom lens barrel as claimed in claim 3, since the cam grooves of the rotatable cam barrel 1 are so formed as not to penetrate through, it is possible to secure sufficient mechanical strength in the rotatable cam barrel 1 as will not be achieved if cam slots are found therein.

According to the zoom lens barrel as claimed in claim 4, it is possible to achieve a wide zoom range. According to the zoom lens barrel as claimed in claim 5, the zoom lens barrel is so designed as to be capable of both zooming and focusing by the use of a single mechanism, and thus it is possible to make good use of the large-angle rotation.

What is claimed is:

1. A zoom lens barrel comprising:
    a stationary barrel fixed to a camera body;
    a rotatable cam barrel that is engaged with said stationary barrel and that moves along an optical axis while rotating about the optical axis;
    a movable barrel that is guided along the optical axis by said stationary barrel and that is fitted to said rotatable cam barrel so as to be movable together therewith along the optical axis and rotatable independently thereof about the optical axis;
    a first lens component fixed to said movable barrel; and
    a second lens component that is cam-driven along the optical axis by said rotatable cam barrel and said movable barrel.

2. A zoom lens barrel as claimed in claim 1,
    wherein said movable barrel is fitted inside said rotatable cam barrel.

3. A zoom lens barrel as claimed in claim 2,
    wherein said rotatable cam barrel has a cam groove carved in its inner surface so as not to penetrate through, said cam groove being cam-coupled to said second lens component.

4. A zoom lens barrel as claimed in claim 1,
wherein said rotatable cam barrel covers an entire zoom range by rotating more than 120°.

5. A zoom lens barrel as claimed in claim 4,
wherein said rotatable cam barrel has three cam grooves formed in its inner surface so as to extend circumferentially.

6. A zoom lens barrel as claimed in claim 1,
wherein said second lens component moves along said optical axis so zooming and focusing are alternately performed.

7. A method of performing zooming in a camera, comprising the steps of:
moving a rotary barrel along an optical axis while rotating it inside a stationary barrel fixed to a camera body;
moving a movable barrel straight along the optical axis in accordance with rotation of said rotary barrel, said movable barrel having a first lens component fixed therein; and
cam-driving a holding member, holding a second lens component, along the optical axis by said roatary barrel and said movable barrel.

8. A method of performing zooming in a camera as claimed in claim 7,
wherein said movable barrel is fitted inside said rotary barrel.

9. A method of performing zooming in a camera as claimed in claim 7,
wherein said rotary barrel has a cam groove carved in its inner surface so as not to penetrate through, said cam groove being cam-coupled to said holding member.

10. A method of performing zooming in a camera as claimed in claim 7,
wherein said rotary barrel covers an entire zoom range by rotating more than 120°.

11. A method of performing zooming in a camera as claimed in claim 10,
wherein said rotary barrel has three cam grooves formed in its inner surface so as to extend circumferentially.

12. A method of performing zooming in a camera as claimed in claim 7,
wherein cam movement is so controlled that zooming and focusing are alternately performed as said second lens component moves along the optical axis.

13. A zoom lens barrel as claimed in claim 1,
wherein said movable barrel is guided straight along the optical axis by said stationary barrel.

14. A zoom lens barrel as claimed in claim 13,
wherein said rotatable cam barrel is screw-engaged with said stationary barrel.

15. A zoom lens barrel as claimed in claim 14,
wherein said second lens component is guided straight along the optical axis by said movable barrel.

16. A zoom lens barrel as claimed in claim 14,
wherein said second lens component is guided straight along the optical axis by said movable barrel.

17. A zoom lens barrel as claimed in claim 1,
wherein said second lens component is guided straight along the optical axis by said movable barrel.

18. A zoom lens barrel as claimed in claim 17,
wherein said rotatable cam barrel is screw-engaged with said stationary barrel.

19. A method of performing zooming in a camera, comprising the steps of:
moving a rotary barrel along an optical axis while rotating it inside a stationary barrel fixed to a camera body;
moving a straight-movable barrel straight along the optical axis in accordance with rotation of said rotary barrel, said straight-movable barrel being disposed inside said rotary barrel and having a first lens component fixed therein; and
moving a holding member, holding a second lens component, inside said straight-movable barrel along the optical axis in accordance with rotation of said rotary barrel, said second lens holding member having a part thereof coupled through said straight-movable barrel to a cam formed on an inner surface of said rotary barrel.

20. A zoom lens barrel comprising:
a stationary barrel fixed to a camera body;
a rotatable cam barrel that is engaged with said stationary barrel and that moves along an optical axis while rotating about the optical axis;
a straight-movable barrel that is guided straight along the optical axis by said stationary barrel and that is fitted to said rotatable cam barrel so as to be movable together therewith along the optical axis and rotatable independently thereof about the optical axis;
a first lend component fixed to said straight-movable barrel; and
a second lens component that is guided straight along the optical axis by said straight-movable barel and that is cam-coupled to said rotatable cam barrel so as to be cam-driven along the optical axis by said rotatable cam barrel.

* * * * *